United States Patent
Sasahara et al.

(10) Patent No.: US 10,502,317 B2
(45) Date of Patent: Dec. 10, 2019

(54) HYDRAULIC SYSTEM AND DRIVING UNIT WITH DECELERATION MECHANISM

(71) Applicant: KANZAKI KOKYUKOKI MFG. CO., LTD., Amagasaki-shi, Hyogo (JP)

(72) Inventors: Kengo Sasahara, Amagasaki (JP); Hiroaki Hashima, Amagasaki (JP); Hajimu Imanaka, Amagasaki (JP); Hiroshi Sugimoto, Amagasaki (JP)

(73) Assignee: KANZAKI KOKYUKOKI MFG. CO., LTD., Amagasaki-shi, Hyogo (JP)

( * ) Notice: Subject to any disclaimer, the term of this patent is extended or adjusted under 35 U.S.C. 154(b) by 324 days.

(21) Appl. No.: 15/416,325

(22) Filed: Jan. 26, 2017

(65) Prior Publication Data
US 2017/0234425 A1 Aug. 17, 2017

(30) Foreign Application Priority Data
Feb. 16, 2016 (JP) ................. 2016-026537

(51) Int. Cl.
*F16H 61/435* (2010.01)
*F16H 1/32* (2006.01)
(Continued)

(52) U.S. Cl.
CPC .......... *F16H 61/435* (2013.01); *F04B 1/324* (2013.01); *F15B 11/08* (2013.01); *F16H 1/32* (2013.01);
(Continued)

(58) Field of Classification Search
CPC .... F04B 1/14; F04B 1/146; F04B 1/28; F04B 1/29; F04B 1/295; F04B 1/324; F16H 61/425; F16H 61/435
See application file for complete search history.

(56) References Cited

U.S. PATENT DOCUMENTS 3,646,754 A * 3/1972 Koch ................ F15B 9/03
60/390
4,014,224 A * 3/1977 Pitts ................ F16H 1/32
475/176
(Continued)

FOREIGN PATENT DOCUMENTS

CN 102213204 A * 10/2011 ............. F04B 1/324

OTHER PUBLICATIONS

CN 102213204 A machine translation to English from espacenet. 2011.*

*Primary Examiner* — Thomas E Lazo
*Assistant Examiner* — Michael Quandt
(74) *Attorney, Agent, or Firm* — Sterne, Kessler, Goldstein & Fox P.L.L.C.

(57) ABSTRACT

A hydraulic system according to the present invention includes a rotational shaft, a hydraulic rotor supported by the rotational shaft so as to be incapable of relative rotation, an output adjuster varying a volume of the hydraulic rotor, a control shaft tilting the output adjuster, a drive motor operating the control shaft around the axis, a drive shaft disposed on a reference axis same as the axis of the control shaft and operably driven around the axis by the drive motor, a deceleration mechanism decelerating rotary power input from the drive shaft and outputs the decelerated rotary power toward the control shaft, and a housing accommodating the hydraulic rotor, the output adjuster, and the deceleration mechanism, wherein the deceleration mechanism has a hypocycloid-type deceleration mechanism disposed on the reference axis.

20 Claims, 11 Drawing Sheets

(51) Int. Cl.
| | |
|---|---|
| *F04B 1/32* | (2006.01) |
| *F15B 11/08* | (2006.01) |
| *F16H 61/425* | (2010.01) |
| *H02K 7/116* | (2006.01) |
| *F16H 39/04* | (2006.01) |
| *F16H 39/00* | (2006.01) |
| *F16H 3/08* | (2006.01) |

(52) U.S. Cl.
CPC ........... *F16H 39/04* (2013.01); *F16H 61/425* (2013.01); *H02K 7/116* (2013.01); *F16H 3/08* (2013.01); *F16H 2001/325* (2013.01); *F16H 2039/005* (2013.01)

(56) References Cited

U.S. PATENT DOCUMENTS

| | | | |
|---|---|---|---|
| 5,123,884 A * | 6/1992 | Kondoh | F16H 1/32 464/89 |
| 5,868,555 A * | 2/1999 | Shimotomai | B30B 15/18 417/222.1 |
| 8,511,216 B2 | 8/2013 | Sasahara et al. | |
| 8,517,138 B2 | 8/2013 | Sashikuma et al. | |
| 9,490,679 B2 * | 11/2016 | Yamamoto | B60K 7/00 |
| 2007/0015619 A1* | 1/2007 | Sasahara | B60K 7/0007 475/178 |
| 2015/0005130 A1* | 1/2015 | Yamamoto | B60K 7/00 475/149 |

* cited by examiner

HYDRAULIC SYSTEM AND DRIVING UNIT WITH DECELERATION MECHANISM

BACKGROUND OF THE INVENTION

Field of the Invention

The present invention relates to a hydraulic system in which a control shaft that alters the volume of a hydraulic rotor is rotated around the axis by rotary power from a drive motor, and to a driving unit including a drive motor that serves as a power source for driving an output shaft, which is a driving target, and a deceleration mechanism that decelerates the rotary power of the drive motor and outputs the decelerated rotary power toward the output shaft.

Related Art

A hydraulic system including a rotational shaft, a hydraulic rotor supported by the rotational shaft so as to be incapable of relative rotation, an output adjuster that varies the volume of the hydraulic rotor, and a control shaft that tilts the output adjuster in accordance with rotation around the axis is widely used as a hydraulic pump system including a hydraulic pump as a hydraulic rotor, a hydraulic motor system including a hydraulic motor as a hydraulic rotor, and a hydrostatic transmission (HST) including a hydraulic pump and a hydraulic motor as hydraulic rotors.

For example, U.S. Pat. Nos. 8,511,216 and 8,517,138 each disclose an HST including an electric motor that serves as a power source for rotating the control shaft around the axis.

This conventional HST includes a deceleration mechanism that decelerates the rotary power of the electric motor and outputs the decelerated rotary power toward the control shaft, and, accordingly, the size of the electric motor can be reduced.

However, the deceleration mechanism in this conventional HST has an electric motor output gear that is fixed to the electric motor output shaft of the electric motor and a sector gear that is fixed to the control shaft and meshes with the electric motor output gear, and is thus problematic in that in order to obtain a sufficient deceleration ratio, the HST increases in size.

That is, in order to obtain a large deceleration ratio with the above conventional configuration, the difference between the pitch diameters of the electric motor output gear and the sector gear has to be increased, and, consequently, the electric motor output shaft needs to be largely displaced from the control shaft in the radial direction with reference to the axis of the control shaft. Accordingly, the conventional HST is problematic in that in order to obtain a sufficient deceleration ratio and reduce the size of the electric motor, the overall size of the HST is increased, especially in the radial direction with reference to the control shaft.

SUMMARY OF THE INVENTION

The present invention has been conceived in view of the conventional art described above, and a first object of the present invention is to provide a hydraulic system in which a control shaft is rotated around the axis by power from a drive motor to vary the volume of a hydraulic rotor, wherein an increase of the overall size of the system can be prevented while the size of the drive motor is reduced.

Moreover, a second object of the present invention is to provide a driving unit having a drive motor that serves as a power source for driving a driving-target output shaft, wherein an increase of the overall size of the unit can be prevented while the size of the drive motor is reduced.

In order to achieve the first object, the present invention provides a hydraulic system including a rotational shaft, a hydraulic rotor supported by the rotational shaft so as to be incapable of relative rotation, an output adjuster that varies a volume of the hydraulic rotor, a control shaft that tilts the output adjuster in accordance with rotation around an axis, a drive motor that produces rotational power for operating the control shaft around the axis, a drive shaft disposed on a reference axis that is the same axis as the axis of the control shaft and operably driven around the axis by the drive motor, a deceleration mechanism that decelerates rotary power operably input from the drive shaft and outputs the decelerated rotary power toward the control shaft, and a housing that accommodates the hydraulic rotor, the output adjuster, and the deceleration mechanism, wherein the deceleration mechanism has a hypocycloid-type deceleration mechanism disposed on the reference axis.

The hydraulic system according to the present invention makes it possible to effectively prevent an increase of the size of the hydraulic system in the radial direction with reference to the axis of the drive shaft and the control shaft while the size of the drive motor is reduced by way of the decelerating action of the hypocycloid-type deceleration mechanism.

The hydraulic system according to the present invention makes it also possible to effectively prevent or reduce reaction force exerted on the output adjuster, which defines a volume of the hydraulic rotor of variable volume type, from being transmitted to the drive motor.

Accordingly, it is possible to lessen the driving force of the drive motor required when retaining the output adjuster at a desired position. For example, in the case of using an electric motor as the drive motor, it is possible to lessen the electric current for the electric motor required when retaining the output adjuster at the desired position and thus possible to suppress electricity consumption.

The drive motor is preferably disposed coaxially with the drive shaft and the control shaft.

The housing may include a hydraulic case that accommodates the hydraulic rotor and the output adjuster, and a unit case that accommodates the deceleration mechanism and the drive motor and is removably connected to the hydraulic case.

The hydraulic case has a control shaft bearing hole that opens an end face of the control shaft outward, and the unit case is connected to the hydraulic case to cover the control shaft bearing hole, with an output member of the hypocycloid-type deceleration mechanism being connected to the control shaft so as to be incapable of relative rotation around the reference axis.

The hydraulic case and the unit case, in a state in which the unit case is connected to the hydraulic case, are preferably configured such that oil is flowable between an accommodating space of the hydraulic case and a deceleration mechanism accommodating space of the unit case.

In one embodiment, the hypocycloid-type deceleration mechanism may include an eccentric member that has a center of rotation eccentric to the reference axis and eccentrically rotates relative to the reference axis in accordance with rotation of the drive shaft around the reference axis, an external tooth member that is supported by the eccentric member so as to be relatively rotatable and is provided with external teeth on an outer circumferential surface, an internal tooth member that has an inner diameter larger than an outer diameter of the external tooth member and is provided with internal teeth that mesh with the external teeth and the number of which is different from the number of the external teeth, and a rotational component extracting member that extracts a rotational component around the reference axis from the external tooth member and outputs the rotational component toward the control shaft.

Preferably, the external tooth member may have a cam hole that penetrates the external tooth member in a direction parallel to the reference axis; and the rotational component extracting member may have a carrier pin having an outer diameter smaller than an inner diameter of the cam hole and inserted into the cam hole.

In this case, the carrier pin is connected to the control shaft.

Any one of the above hydraulic systems preferably includes a brake that directly or indirectly applies braking force to the drive shaft.

The brake is of a negative type that applies breaking force to the drive shaft when the drive motor is not driven, and cancels the breaking force to the drive shaft when the drive motor is driven.

In a first aspect, the eccentric member is supported by the drive shaft so as to be incapable of relative rotation.

In the first aspect, the housing may include a hydraulic case that accommodates the hydraulic rotor and the output adjuster and a unit case that accommodates the deceleration mechanism and the drive motor.

The hydraulic case has a control shaft bearing hole that opens the end face of the control shaft outward. The unit case has a peripheral wall that extends in the reference axis direction, and a partitioning wall that partitions an internal space of the peripheral wall into a drive motor accommodating space on a first side in the reference axis direction and a deceleration mechanism accommodating space on a second side in the reference axis direction, which is opposite to the first side, and is provided with a drive shaft bearing hole through which the drive shaft is inserted. The unit case is removably connected to the hydraulic case so as to cover the control shaft bearing hole, with the deceleration mechanism accommodating space facing the end face of the control shaft.

For example, the unit case may include a deceleration case that forms the deceleration mechanism accommodating space and a motor case that forms the drive motor accommodating space.

In this case, the deceleration case has a deceleration-case-side peripheral wall that forms a part of the peripheral wall, and an end wall that blocks the first side in the reference axis direction of the deceleration-case-side peripheral wall and forms the partitioning wall. The motor case is removably connected to the first side in the reference axis direction of the deceleration case.

In a second aspect, the deceleration mechanism may have a microtraction-type deceleration mechanism on at least one of an upstream side and a downstream side of the hypocycloid-type deceleration mechanism in a power transmission direction from the drive shaft to the control shaft.

In the second aspect, the microtraction-type deceleration mechanism may include a bearing member that has an inner ring directly or indirectly connected to the drive shaft so as to be incapable of relative rotation, a plurality of rolling elements, and an outer ring, and is capable of bearing a radial load and a unidirectional axial load, a retainer that retains the plurality of rolling elements around the inner ring at predetermined intervals while allowing the rolling elements to rotate around respective centers of rotation, and rotates around an axis of the inner ring in accordance with an orbital rotation of the plurality of rolling elements around the inner ring, and a preloading mechanism that presses at least one of the inner ring and the outer ring in the axial direction to exert a radial load on the rolling elements.

In the second aspect, the housing includes a hydraulic case that accommodates the hydraulic rotor and the output adjuster and a unit case that accommodates the deceleration mechanism and the drive motor. The hydraulic case has a control shaft bearing hole that opens the end face of the control shaft outward.

In one embodiment of the second aspect, the unit case has a peripheral wall that extends in the reference axis direction, and a partitioning wall that partitions an internal space of the peripheral wall into a drive motor accommodating space on a first side in the reference axis direction and a deceleration mechanism accommodating space on a second side in the reference axis direction, which is opposite to the first side, and is provided with a drive shaft bearing hole through which the drive shaft penetrates the partitioning wall. The unit case is removably connected to the hydraulic case so as to cover the control shaft bearing hole, with the deceleration mechanism accommodating space facing the end face of the control shaft.

The deceleration mechanism accommodating space has a first accommodating space that is in communication with the drive motor accommodating space via the drive shaft bearing hole, and a second accommodating space that is in communication with the first accommodating space and opens to the second side in the reference axis direction so as to face the end face of the control shaft.

In this case, the outer ring is engaged with an inner circumferential surface of the unit case that defines the first accommodating space so as to be incapable of rotation around the axis and movable in the axial direction. The internal tooth member is engaged with the inner circumferential surface of the unit case that defines the second accommodating space so as to be incapable of rotation around the axis.

In one embodiment, preferably, the first accommodating space increases in diameter via a step from an end on the second side in the reference axis direction of the drive shaft bearing hole. The spring that acts as the preloading mechanism is interposed between the step and the end face on the first side in the reference axis direction of the outer ring.

A cylindrical member is disposed in the inner ring so as to be incapable of relative rotation around the axis and incapable of relative movement in the axial direction. An inner circumferential surface of the cylindrical member has a spline that is engaged with a spline provided in the drive shaft.

In this case, the drive shaft has a stopper that is engaged with an end face on the second side in the reference axis direction of the cylindrical member to prevent movement of the cylindrical member and the inner ring toward the second side in the reference axis direction.

In another embodiment of the second aspect, the unit case has a deceleration case that has a peripheral wall extending in the reference axis direction and a partitioning wall partitioning an internal space of the peripheral wall into a first accommodating space that opens toward a first side in the reference axis direction and a second accommodating space that opens toward a second side in the reference axis direction, which is opposite to the first side, and a motor case that has a drive motor accommodating space and is removably connected to the deceleration case.

In this case, the outer ring is engaged with an inner circumferential surface of the deceleration case that defines the first accommodating space so as to be incapable of rotation around the axis and movable in the axial direction. The internal tooth member is engaged with the inner circumferential surface of the deceleration case that defines the second accommodating space so as to be incapable of rotation around the axis.

The deceleration case is removably connected to the hydraulic case to cover the control shaft bearing hole, with the end face of the control shaft facing the second accommodating space.

The motor case has an end wall provided with a drive shaft bearing hole through which the drive shaft penetrates the motor case, and is removably connected to the deceleration case to cover the opening of the first accommodating space with the end wall.

In another embodiment, preferably, the first accommodating space has a large diameter part opening toward the first side in the reference axis direction and a step extending radially inward from the second side in the reference axis direction of the large diameter part. A spring that acts as the preloading mechanism is interposed between the step and an end face on the second side in the reference axis direction of the outer ring.

A cylindrical member is disposed in the inner ring so as to be incapable of relative rotation around the axis and incapable of relative movement in the axial direction. An inner circumferential surface of the cylindrical member has a spline that is engaged with a spline provided on the drive shaft.

In this case, movement of the cylindrical member toward the first side in the reference axis direction is prevented by a bearing member provided in the drive shaft bearing hole to support the drive shaft so as to be rotatable around the axis.

Further, in order to achieve the second object, the present invention provides a driving unit with a deceleration mechanism including a drive motor that serves as a power source for driving a drive-target output shaft disposed on a reference axis, a drive shaft that is disposed on the reference axis on a first side in a reference axis direction and rotated around the axis by rotary power from the drive motor, a deceleration mechanism that decelerates rotary power of the drive shaft and outputs the decelerated rotary power toward the output shaft disposed on a second side in the reference axis direction, which is opposite to the first side, and a unit case that accommodates the drive motor and the deceleration mechanism, wherein the deceleration mechanism has a hypocycloid-type deceleration mechanism, and a microtraction-type deceleration mechanism disposed on at least one of an upstream side and a downstream side of the hypocycloid-based deceleration mechanism in a power transmission direction.

The driving unit with deceleration mechanism according to the present invention makes it possible to effectively reduce the size of the driving unit in the radial direction with reference to the axis of the drive shaft and the output shaft while reducing the size of the drive motor thanks to a larger deceleration ratio.

The driving unit with deceleration mechanism preferably includes a brake that directly or indirectly applies braking force to the drive shaft.

The brake is of a negative type that applies breaking force to the drive shaft when the drive motor is not driven, and cancels the breaking force to the drive shaft when the drive motor is driven

BRIEF DESCRIPTION OF THE DRAWINGS

The above, and other objects, features and advantages of the present invention will become apparent from the detailed description thereof in conjunction with the accompanying drawings therein.

DETAILED DESCRIPTION OF THE PREFERRED EMBODIMENTS

First Embodiment

Below, one embodiment of the hydraulic system of the present invention will now be described with reference to the attached drawings.

Figure 1:
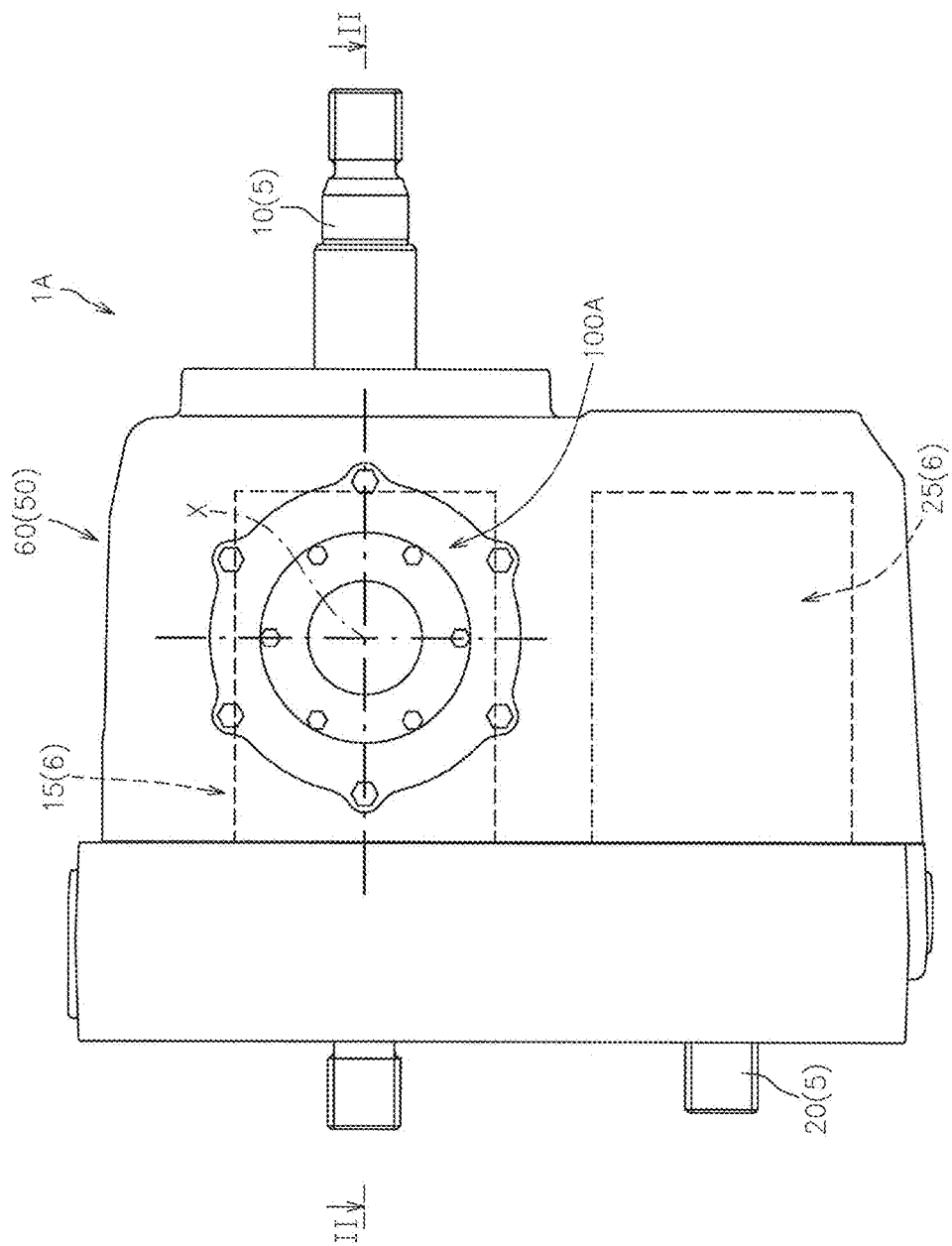
FIG. 1 is an end view of a hydraulic system according to a first embodiment of the present invention.

FIG. 1 shows an end view of a hydraulic system 1A according to this embodiment.

Figure 2:
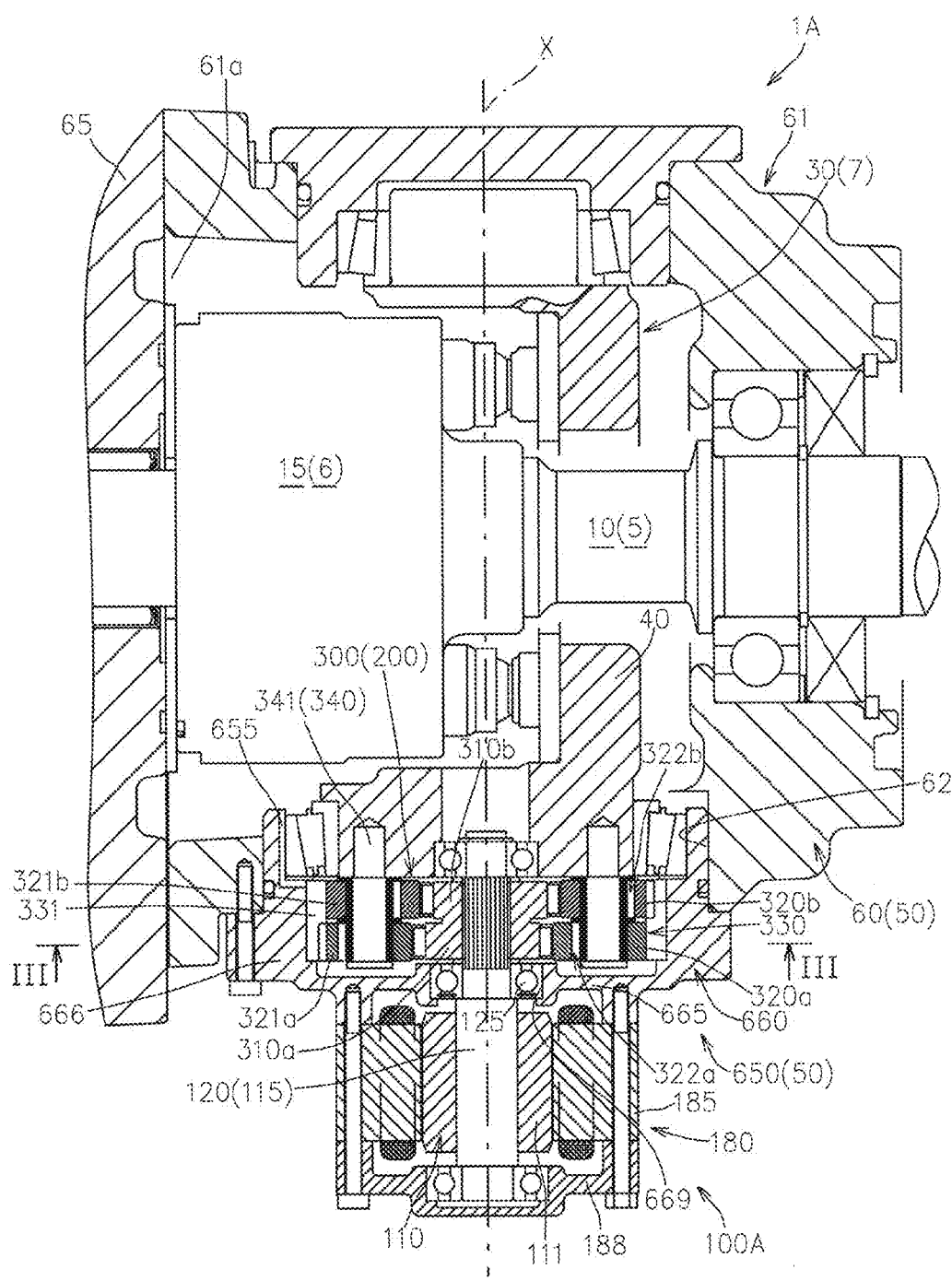
FIG. 2 is a cross-sectional view taken along the line II-II in FIG. 1.

FIG. 2 shows a cross-sectional view taken along the line II-II in FIG. 1.

The hydraulic system 1A has a rotational shaft 5, a hydraulic rotor 6 supported by the rotational shaft 5 so as to be incapable of relative rotation, an output adjuster 7 that varies the volume of the hydraulic rotor 6, a control shaft 40 that tilts the output adjuster 7 in accordance with rotation around the axis, and a housing 50 that accommodates the hydraulic rotor 6 and the output adjuster 7.

As shown in FIGS. 1 and 2, the hydraulic system 1A according to this embodiment is a hydrostatic transmission (HST).

Specifically, the hydraulic system 1A has, as the rotational shaft 5, a pump shaft 10 and a motor shaft 20, and also has, as the hydraulic rotor 6, a hydraulic pump 15 supported by the pump shaft 10 so as to be incapable of relative rotation and a hydraulic motor 25 supported by the motor shaft 20 so as to be incapable of relative rotation. The hydraulic pump 15 and the hydraulic motor 25 are fluidly connected to each other via a pair of hydraulic oil lines (not shown), and at least one is configured to be a variable volume type.

The hydraulic system 1A according to this embodiment, as shown in FIG. 2, has a movable-type pump swash plate 30 as the output adjuster 7 that alters the volume of the hydraulic pump 15 in accordance with tilting movement around a rocking axis.

In this case, the control shaft 40 is connected to the movable-type pump swash plate 30 so as to be capable of tilting the pump swash plate 30 around the rocking axis in accordance with the rotation of the control shaft 40 around its own axis.

Figure 3:
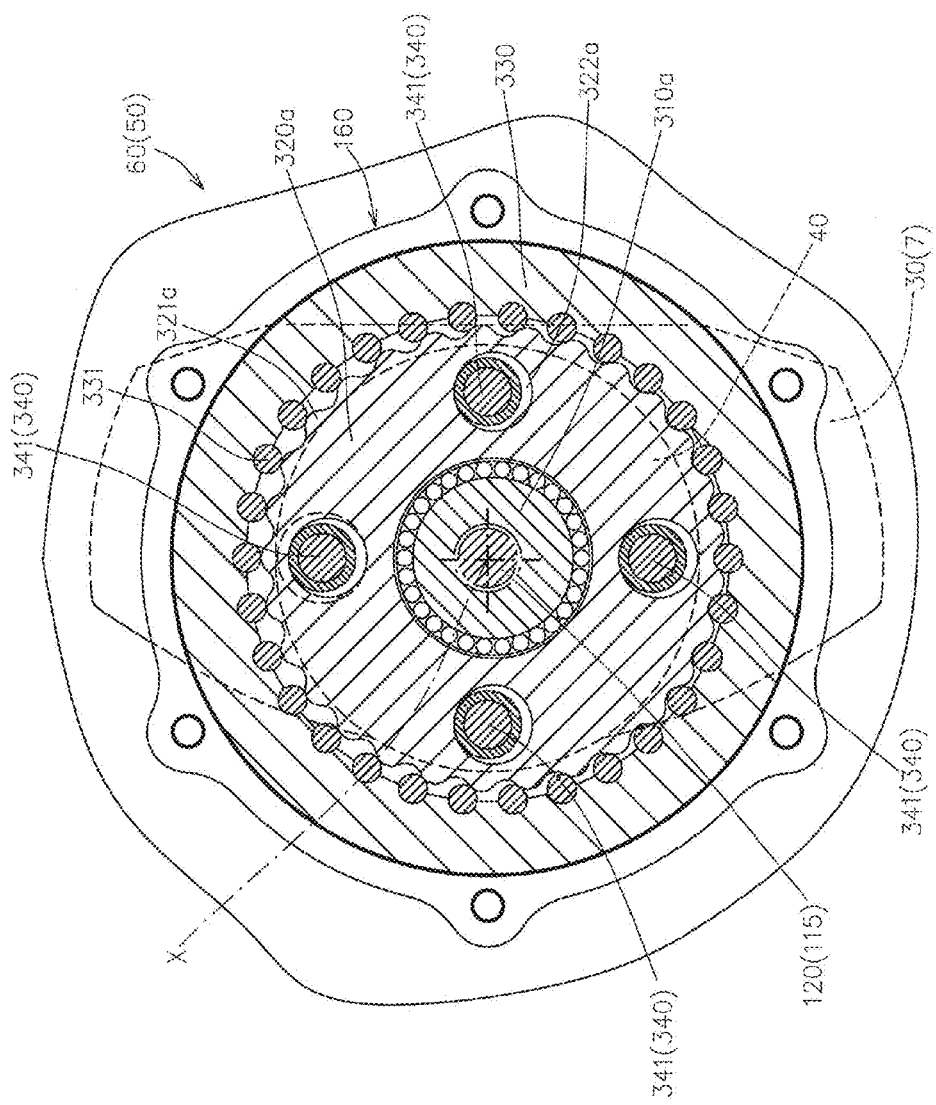
FIG. 3 is a cross-sectional view taken along the line in FIG. 2.

FIG. 3 shows a cross-sectional view taken along the line in FIG. 2.

As shown in FIGS. 2 and 3, the hydraulic system 1A according to this embodiment further has a drive motor 110 that serves as a power source for rotationally driving the control shaft 40 around the axis, a drive shaft 120 operably driven around the axis by the drive motor 110, and a deceleration mechanism 200 that decelerates rotary power operably input from the drive shaft 120 and outputs the decelerated rotary power toward the control shaft 40.

In this embodiment, the drive motor 110, the drive shaft 120, and the deceleration mechanism 200, together with a unit case 650 that accommodates and supports these components, form a driving unit 100A.

That is, in the hydraulic system according to this embodiment, the housing 50 has a hydraulic case 60 that accommodates the hydraulic pump 15, the hydraulic motor 25, and the output adjuster 7, and the unit case 650 that supports and accommodates the drive shaft 120 and the deceleration mechanism 200 and is removably connected to the hydraulic case 60.

As shown in FIG. 2, the hydraulic case 60 has a hydraulic case body 61 that has openings 61a into which the hydraulic rotors 6 (the hydraulic pump 15 and the hydraulic motor 25 in this embodiment) can be inserted and a port block 65 that is removably attached to the hydraulic case body 61 so as to close the openings 61a.

In this configuration, the pair of hydraulic oil lines are formed in the port block 65.

The hydraulic case 60 (the hydraulic case body 61 in this embodiment) has a control shaft bearing hole 62 that opens the end face of the control shaft 40 outward, and the unit case 650 is connected to the hydraulic case 60 to block the control shaft bearing hole 62, with the output member of the deceleration mechanism 200 being connected to the end face of the control shaft 40 so as to be incapable of relative rotation around the axis.

The unit case 650 as shown in FIG. 2 has a deceleration case 660 that defines a deceleration mechanism accommodating space for accommodating the deceleration mechanism 200, and a motor case 180 that defines a drive motor accommodating space for accommodating the drive motor 110 and is removably connected to the deceleration case 660.

The drive shaft 120 is supported by the housing 50 so as to be rotatable around the axis and aligned with the axis of the control shaft 40 (hereinafter referred to as a reference axis X).

In this embodiment, the drive shaft 120 is supported by the unit case 650 so as to be rotatable around the axis and is operably rotated/driven by the drive motor 110, and the unit case 650 is connected to the hydraulic case 60 such that the drive shaft 120 is placed on the reference axis X.

The axis of the control shaft 40 (the reference axis X) matches the rocking axis that serves as the tilting center of the output adjuster 7.

As shown in FIG. 2, the drive motor 110 has a drive motor body 111 that produces power for rotationally driving the control shaft 40 and a drive motor output shaft 115 that outputs the rotary power of the drive motor body 111.

In this embodiment, as shown in FIG. 2, the drive motor output shaft 115 acts as the drive shaft 120.

Instead, the drive shaft 120 can also be a component separate from the drive motor output shaft 115.

In this case, the drive shaft 120 is disposed on the reference axis X, and the drive motor output shaft 115 is disposed on, or displaced from, the reference axis X and is operably connected to the drive shaft 120.

In this embodiment, the drive motor 110 is an electric motor.

Instead, the drive motor 110 can also be formed of a hydraulic motor.

The deceleration mechanism 200 has a hypocycloid-type deceleration mechanism 300.

The hypocycloid-type deceleration mechanism 300 is disposed on the reference axis X, and decelerates rotary power that is directly or indirectly input from the drive shaft 120 and outputs the decelerated rotary power toward the control shaft 40.

Specifically, as shown in FIGS. 2 and 3, the hypocycloid-type deceleration mechanism 300 has an eccentric member 310 that has a center of rotation eccentric to the reference axis X and eccentrically rotates relative to the reference axis X in accordance with the rotation of the drive shaft 120 around the reference axis X, an external tooth member 320 supported by the eccentric member 310 so as to be relatively rotatable and provided with external teeth on the outer circumferential surface, an internal tooth member 330 having an inner diameter larger than the outer diameter of the external tooth member 320 and provided with teeth that mesh with the external teeth and the number of which is different from the number of the external teeth, and a rotational component extracting member 340 that extracts a rotational component around the reference axis X from the external tooth member 320.

In this embodiment, as shown in FIGS. 2 and 3, the distal part of the drive shaft 120 is formed with a spline, and the eccentric member 310 is spline-connected to the drive shaft 120 so that the eccentric member 310 eccentrically rotates around the reference axis X in accordance with the rotation of the drive shaft 120 around the reference axis X, with the center of rotation of the eccentric member 310 being displaced to a predetermined extent from the reference axis X.

The external tooth member 320 is in the form of a circular ring having a central hole for being externally fitted over the eccentric member 310 so as to be relatively rotatable, and has external teeth 321 that are provided on the outer circumferential surface and the number of which is Z1, and a cam hole 322 that penetrates in the axial direction between the inner circumferential surface and the outer circumferential surface.

Preferably, a plurality of cam holes 322 are provided around the reference axis X.

The internal tooth member 330 is in the form of a circular ring having a central hole surrounding the external tooth member 320 and is provided with internal teeth 331 that mesh with the external teeth 321 on the inner circumferential surface that defines the central hole.

The number Z2 of the internal teeth 331 is different from the number Z1 of the external teeth 321.

The rotational component extracting member 340 has a carrier pin 341 inserted into the cam hole 322, and outputs the orbital rotation of the carrier pin 341 around the reference axis X as decelerated rotation.

The diameter of the carrier pin 341 is smaller than the diameter of the cam hole 322 to an extent corresponding to the eccentricity of the eccentric member 310 relative to the reference axis X.

As described above, in this embodiment, a plurality of cam holes 322 are provided in the external tooth member 320.

Accordingly, the rotational component extracting member 340 has a plurality of carrier pins 341 inserted into the plurality of cam holes 322, respectively.

In this embodiment, as shown in FIG. 2, the carrier pins 341 are supported by the end face on a first side in the reference axis direction of the control shaft 40, and the control shaft 40 rotates around the reference axis X in accordance with the orbital rotation of the carrier pins 341 around the reference axis X.

Instead, it is also possible to provide the rotational component extracting member 340 with a flange part that supports the carrier pins 341 and rotates around the reference axis X and an output shaft part that rotates around the reference axis X together with the flange part, and connect the output shaft part to the control shaft 40 so as to be incapable of relative rotation around the reference axis X.

In the hypocycloid-type deceleration mechanism 300, as the drive shaft 120 rotates around the reference axis X, the eccentric member 310 eccentrically rotates relative to the reference axis X, and the external tooth member 320 also eccentrically rotates relative to the reference axis X together with the eccentric member 310.

In this case, since the external teeth 321 are meshed with the internal teeth 331, the external tooth member 320 rotates in a decelerated manner that corresponds to the deceleration ratio defined by the number Z1 of the external teeth 321 and the number Z2 of the internal teeth 331.

In accordance with the decelerated eccentric rotation of the external tooth member 320, the carrier pins 341 orbit the reference axis X while rolling on the inner circumferential surfaces of the cam holes 322. Then, the orbital rotation of the carrier pins 341 around the reference axis X is transmitted to the control shaft 40 as decelerated rotary power.

In this embodiment, as shown in FIGS. 2 and 3, the hypocycloid-type deceleration mechanism 300 can include a pair of first and second eccentric members 310a, 310b provided next to each other in the reference axis direction as the eccentric member 310, and a pair of first and second external tooth members 320a, 320b respectively corresponding to the first and second eccentric members 310a, 310b as the external tooth member 320.

The first and second eccentric members 310a, 310b are displaced 180 degrees with reference to the reference axis X.

As shown in FIGS. 2 and 3, the first and second external tooth members 320a, 320b respectively have first external teeth 321a and second external teeth 321b, and first and second cam holes 322a, 322b that extend in the direction parallel to the reference axis X and are placed in substantially the same circumferential positions with reference to the reference axis X.

The carrier pins 341 are inserted into both the first and second cam holes 322a, 322b that are placed in substantially the same circumferential positions.

Thus, by providing the first and second eccentric members 310a, 310b that are displaced 180 degrees around the reference axis X, it is possible to offset the eccentric torque associated with the rotation of the eccentric member 310.

In this configuration, the internal teeth 331 are meshed with both the first and second external teeth 321a, 321b.

As shown in FIG. 2, in this embodiment, the hydraulic case 60 and the unit case 650, in a state in which the unit case 650 is connected to the hydraulic case 60, are configured such that oil is flowable between the accommodating space of the hydraulic case 60 and the deceleration mechanism accommodating space of the unit case 650.

Specifically, the deceleration case 660 in the unit case 650 has a peripheral wall 666 that extends in the reference axis direction and an end wall 665 that blocks the first side in the reference axis direction (the side close to the drive motor 110) of the peripheral wall 666.

A second side in the reference axis direction (the side close to the control shaft 40), which is opposite to the first side, of the peripheral wall 666 is an opening into which the hypocycloid-type deceleration mechanism 300 can be inserted.

The end wall 665 has a drive shaft bearing hole 669 that supports the drive shaft 120 via a bearing member 125.

The motor case 180 has a cylindrical motor case body 185 that includes a peripheral wall extending in the reference axis direction so as to surround the drive motor body 111 and a lid member 188 that is removably connected to the motor case body 185 so as to block the opening of the motor case body 185 on the first side in the reference axis direction.

The opening of the motor case body 185 on the first side in the reference axis direction has a size that enables the drive motor body 111 to be inserted.

In this embodiment, the deceleration case 660 is fixed to the hydraulic case 60, with the peripheral wall 666 of the deceleration case 660 being placed in and engaged with the control shaft bearing hole 62 in a fluid-tight manner, and the control shaft 40 is supported so as to be rotatable around the axis by the inner circumferential surface of the peripheral wall 666 of the deceleration case 660 via a bearing member 45.

In this configuration, the inner circumferential surface of the peripheral wall 666 of the deceleration case 660 has an oil groove 655 that causes the internal space of the hydraulic case 60 to be in communication with the deceleration mechanism accommodating space of the deceleration case 660 when the deceleration case 660 is connected to the hydraulic case 60.

The bearing member 125 provided in the drive shaft bearing hole has a sealing function, and the drive motor accommodating space is separated from the deceleration mechanism accommodating space in a fluid-tight manner by the bearing member 125.

According to the hydraulic system 1A according to this embodiment, the decelerated rotary power of the drive shaft 120 is transmitted to the control shaft 40 by the hypocycloid-type deceleration mechanism 300 that is disposed coaxially with the drive shaft 120 and the control shaft 40.

Accordingly, it is possible to effectively prevent an increase of the size of the hydraulic system 1A in the radial direction with reference to the axis of the drive shaft 120 and the control shaft 40 while the size of the drive motor 110 is reduced by way of the decelerating action of the hypocycloid-type deceleration mechanism 300.

Moreover, the deceleration mechanism 200 disposed in a control shaft driving path from the drive motor 110 to the control shaft 40 has the hypocycloid-type deceleration mechanism 300, and, accordingly, it is possible to effectively prevent unintentional rotation of the control shaft 40 resulting from reaction force exerted on the movable swash plate 30.

That is, the hypocycloid-type deceleration mechanism 300 has self-locking characteristics.

Accordingly, it is possible to effectively prevent or reduce reaction force exerted on the movable swash plate 30 from being transmitted to the drive motor 110, and it is thus possible to lessen the driving force of the drive motor 110 required when retaining the movable swash plate 30 at a desired tilt position.

In the case of using an electric motor as the drive motor 110, it is possible to lessen the electric current for the electric motor required when retaining the movable swash plate 30 at a desired tilt position and thus possible to suppress electricity consumption.

Second Embodiment

Below, another embodiment of the hydraulic system of the present invention will now be described with reference to the attached drawings.

Figure 4:
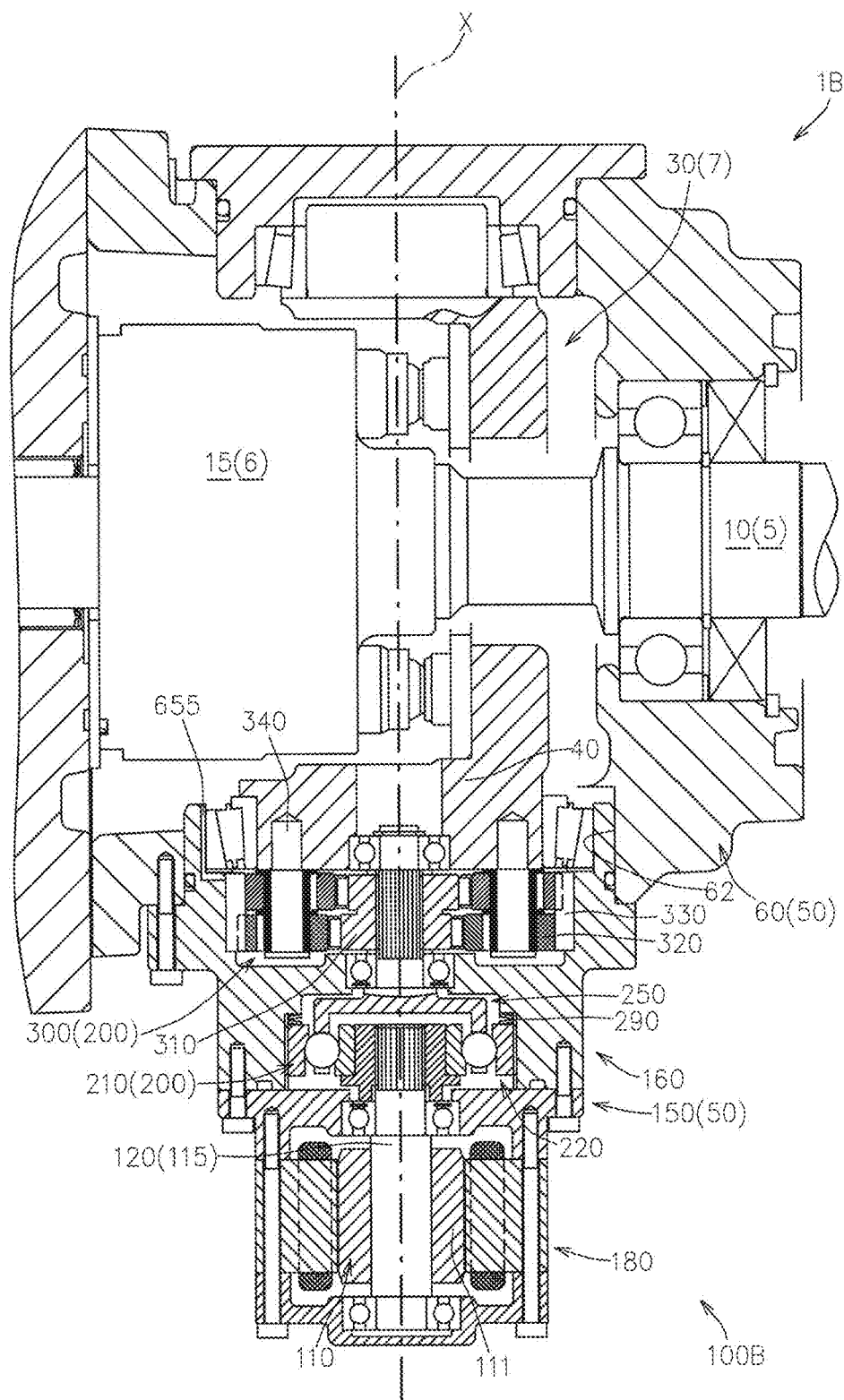
FIG. 4 is a cross-sectional view of a hydraulic system according to a second embodiment of the present invention, and corresponds to FIG. 2 of the first embodiment.

FIG. 4 shows a cross-sectional view of a hydraulic system 1B according to this embodiment.

Figure 5:
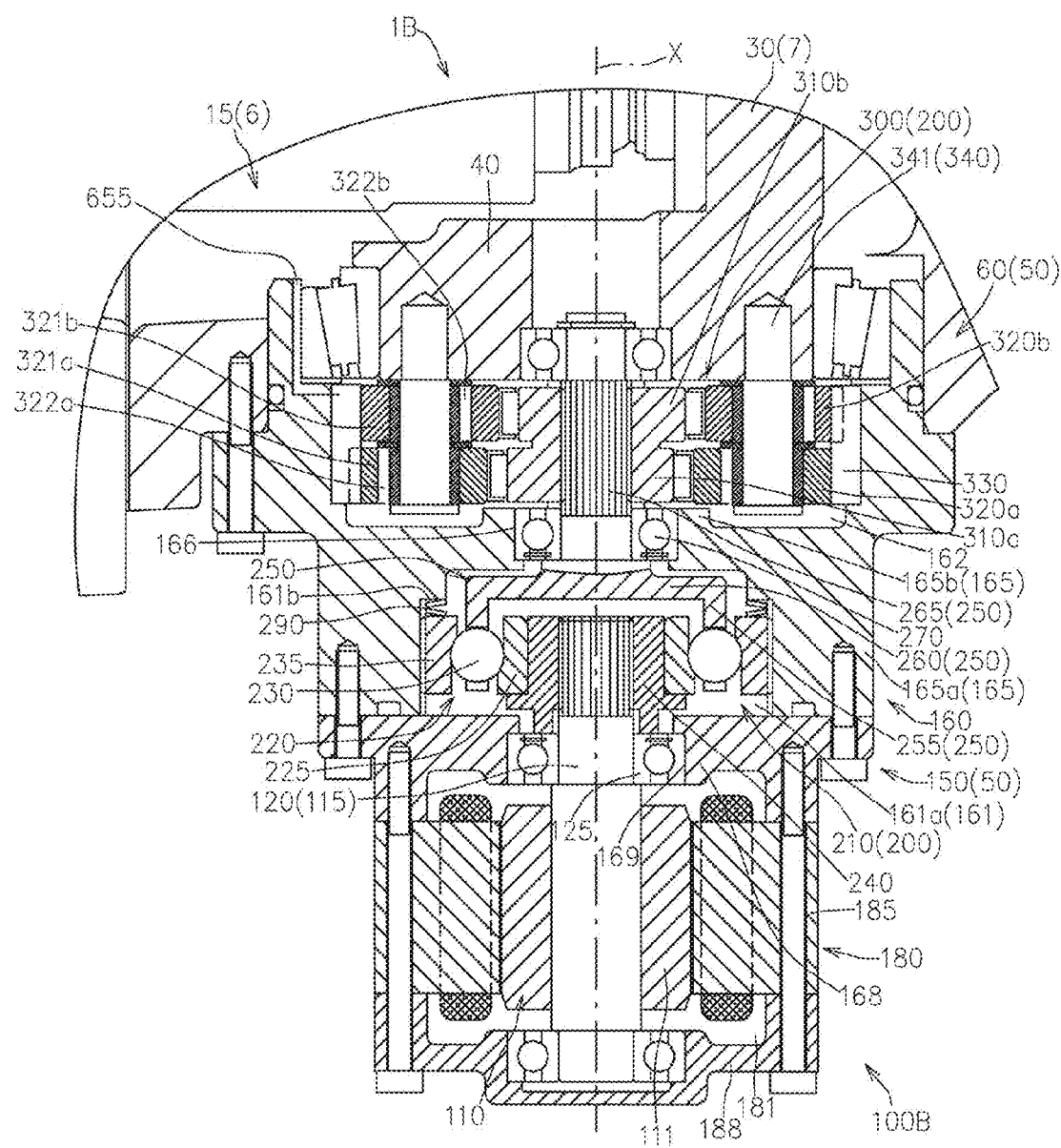
FIG. 5 is a partially enlarged view of FIG. 4.

FIG. 5 shows a partially enlarged view of FIG. 4.

In the drawings, substantially the same components as those in the first embodiment are given the same reference numbers, and descriptions thereof are omitted as appropriate.

The hydraulic system 1B according to this embodiment is different from the hydraulic system 1A according to the first embodiment in that the deceleration mechanism 200 has a microtraction-type deceleration mechanism 210 in addition to the hypocycloid-type deceleration mechanism 300.

In this embodiment, as shown in FIGS. 4 and 5, the deceleration mechanism 200 has the microtraction-type deceleration mechanism 210 on the upstream side of the hypocycloid-type deceleration mechanism 300 in the power transmission direction, and rotary power that has been primarily decelerated by the microtraction-type deceleration mechanism 210 is input into the hypocycloid-type deceleration mechanism 300.

That is, in the hydraulic system 1B according to this embodiment, the rotary power of the drive shaft 120 is primarily decelerated by the microtraction-type deceleration mechanism 210, the rotary power that has been primarily decelerated by the microtraction-type deceleration mechanism 210 is secondarily decelerated by the hypocycloid-type deceleration mechanism 300, and the resulting rotary power is transmitted to the control shaft 40.

Specifically, compared with the hydraulic system 1A of the first embodiment, the hydraulic system 1B has a driving unit 100B in place of the driving unit 100A.

As shown in FIGS. 4 and 5, the driving unit 100B includes the drive motor 110, the drive shaft 120 into which rotary power from the drive motor 110 is directly or indirectly input, the microtraction-type deceleration mechanism 210 that primarily decelerates the rotary power of the drive shaft 120, the hypocycloid-type deceleration mechanism 300 that secondarily decelerates the rotary power that has been decelerated by the microtraction-type deceleration mechanism 210 and transmits the resulting rotary power to the control shaft 40, and a unit case 150 that accommodates the drive motor 110, the hypocycloid-type deceleration mechanism 300, and the microtraction-type deceleration mechanism 210.

The microtraction-type deceleration mechanism 210 includes a bearing member 220, a retainer 250, and a preloading mechanism 290.

The bearing member 220 has an inner ring 225, a plurality of rolling elements 230 provided on the outer circumference of the inner ring 225, and an outer ring 235 surrounding the plurality of rolling elements 230, and is capable of bearing a radial load and a unidirectional axial load.

Rotary power to be decelerated is input from the drive shaft 120 into the inner ring 225.

In this embodiment, as shown in FIGS. 4 and 5, a cylindrical member 240 is disposed in the inner ring 225 so as to be incapable of relative rotation around the axis and incapable of relative movement in the axial direction.

A spline is provided in the inner circumferential surface of the cylindrical member 240 for connection to the spline formed in the outer circumferential surface of the drive motor output shaft 115 that acts as the drive shaft 120.

Thus, in this embodiment, the inner ring 225 is made incapable of relative rotation relative to the drive shaft 120 via the cylindrical member 240 that is disposed in the inner ring 225 so as to be incapable of relative rotation and that is connected to the drive shaft 120 so as to be incapable of relative rotation via spline connection.

In this embodiment, as shown in FIGS. 4 and 5, the bearing member 220 is an angular contact ball bearing in which angular contact balls are used as the rolling elements 230 but, instead, it is also possible to use a conical roller bearing in which conical rollers are used as the rolling elements.

The outer ring 235 surrounds the plurality of rolling elements 230 such that the plurality of rolling elements 230 are interposed between the inner ring 225 and the outer ring 235 in the radial direction with reference to the axis of the inner ring 225, and is fixed so as to be incapable of rotation around the axis.

One of the inner ring 225 and the outer ring 235 is an axial direction movable body that is movable in the axial direction, and the preloading mechanism 290 is configured to press the axial direction movable body toward a normal force generated side in the axial direction.

On the other hand, the other of the inner ring 225 and the outer ring 235 is an axial direction fixed body, the movement of which toward the normal force generated side in the axial direction is prevented, and, accordingly, normal force required for power transmission is applied to the bearing member 220 by the preloading mechanism 290.

As shown in FIGS. 4 and 5, in this embodiment, the outer ring 235 is an axial direction movable body, and the first side in the reference axis direction (the side on which the drive shaft 120 is placed in the axial direction) is the normal force generated side in the axial direction.

The preloading mechanism 290 biases a component that serves as the axial direction movable body, which is either the inner ring 225 or the outer ring 235, toward the normal force generated side in the axial direction.

As described above, in this embodiment, the outer ring 235 is the axial direction movable body, the first side in the reference axis direction is the normal force generated side in the axial direction, and, as shown in FIGS. 4 and 5, a spring that forms the preloading mechanism 290 is disposed to press the outer ring 235 toward the first side in the reference axis direction.

Next, the retainer 250 will now be described.

Figure 6:
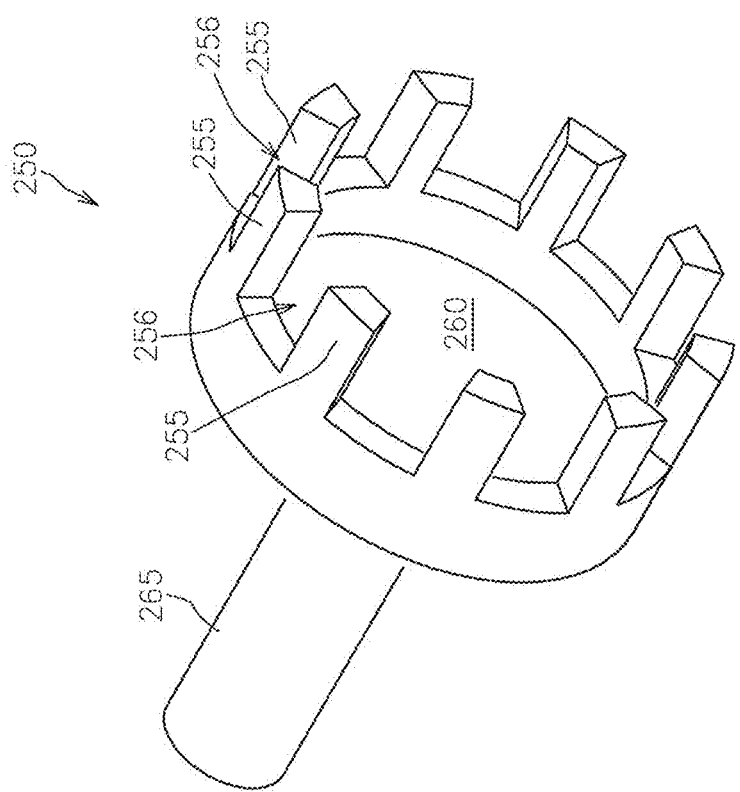
FIG. 6 is a perspective view of a retainer in a microtraction-type deceleration mechanism that forms a part of a deceleration mechanism in the hydraulic system according to the second embodiment.

FIG. 6 shows a perspective view of the retainer 250.

The retainer 250 retains the plurality of rolling elements 230 that are held in a rotatable state between the inner ring 225 and the outer ring 235 in the radial direction, at predetermined intervals in the circumferential direction.

Specifically, as shown in FIGS. 5 and 6, the retainer 250 has a plurality of partitions 255 placed between the inner ring 225 and the outer ring 235 in the radial direction and provided at predetermined intervals in the circumferential direction, a connector 260 that connects the plurality of partitions 255 so as to cause the plurality of partitions 255 to integrally rotate around the reference axis X, and a shaft 265 that rotates around the reference axis X together with the connector 260.

The predetermined intervals between the partitions 255 adjacent in the circumferential direction form rolling element retaining spaces 256 where the rolling elements 230 are retained in a rotatable state.

As shown in FIG. 6, the distal parts of the plurality of partitions 255 on the side far from the shaft 265 are free-ends and form a comb-like body, and the rolling element retaining spaces 256 are open on the side far from the connector 260.

As shown in FIGS. 4 and 5, the unit case 150 has a deceleration case 160 that accommodates the deceleration mechanism 200 and a motor case 180 that accommodates the drive motor 110, and the motor case 180 is removably connected to the first side in the reference axis direction of the deceleration case 160.

The deceleration case 160 has a first accommodating space 161 that is open toward the first side in the reference axis direction, and a second accommodating space 162 is open toward the second side in the reference axis direction, which is opposite to the first sided, and is in communication with the first accommodating space 161.

Specifically, the deceleration case 160 has a deceleration case body 165 that has a peripheral wall 165a extending in the reference axis direction and a partitioning wall 165b that partitions the internal space of the peripheral wall 165a into first and second accommodating spaces 161, 162, and a lid member 168 removably connected to the deceleration case body 165 so as to block the opening of the deceleration case body 165 on the first accommodating space 161 side.

The first accommodating space 161 serves as an accommodating space for the microtraction-type deceleration mechanism 210, and the second accommodating space 162 serves as an accommodating space for the hypocycloid-type deceleration mechanism 300.

The outer ring 235 is inserted into the first accommodating space 161 from the first side in the reference axis direction so as to be incapable of rotation around the axis and movable in the axial direction.

Specifically, the outer circumferential surface of the outer ring 235 is engaged with the inner circumferential surface of the deceleration case 160 that defines the first accommodating space 161 such that the outer ring 235 is incapable of rotation around the axis and movable in the axial direction.

In this embodiment, as shown in FIG. 5, the outer circumferential surface of the outer ring 235 and the inner circumferential surface of the deceleration case 160 that defines the first accommodating space 161 are spline-connected with each other.

In this embodiment, as shown in FIG. 5, the first accommodating space 161 has a large diameter part 161a that is open toward the first side in the reference axis direction, the opening width of which enables the outer ring 235 to be inserted, and a step 161b that extends radially inward from the second side in the reference axis direction of the large diameter part 161a.

Being engaged with the inner circumferential surface of the large diameter part 161a, the outer ring 235 is incapable of rotation around the axis and is movable in the axial direction.

The step 161b functions as the seat of a spring that forms the preloading mechanism 290.

That is, the spring that forms the preloading mechanism 290 is interposed between the step 161b and the end face on the second side in the reference axis direction of the outer ring 235 and, accordingly, presses the outer ring 235 toward the normal force generated side in the axial direction (the first side in the reference axis direction in this embodiment).

On the other hand, the movement of the inner ring 225 toward the normal force generated side in the axial direction (the first side in the reference axis direction in this embodiment) is prevented by the following configuration.

That is, as shown in FIG. 5, the lid member 168 has a bearing hole 169 into which the drive shaft 120 is inserted, and the bearing hole 169 is provided with the bearing member 125 that supports an intermediate part in the axial direction of the drive shaft 120 (a portion of the drive shaft 120 that is located more toward the first side in the reference axis direction than the portion spline-connected to the cylindrical member 240) so as to be rotatable around the axis.

In this configuration, the end of the cylindrical member 240 on the first side in the reference axis direction is in contact with the bearing member 125, and thus the movement of the inner ring 225 that is integrally connected to the cylindrical member 240 toward the normal force generated side in the axial direction (the first side in the reference axis direction in this embodiment) is prevented.

As shown in FIG. 5, the partitioning wall 165b of the deceleration case body 165 has a bearing hole 166 into which the shaft 265 of the retainer is inserted; the shaft 265 is rotatably supported via a bearing member 270 provided in the bearing hole 166, and the distal part enters the second accommodating space 162; and rotary power that has been decelerated by the microtraction-type deceleration mechanism 210 is transmitted to the hypocycloid-type deceleration mechanism 300.

In this embodiment, the shaft 265 of the retainer 250 functions as a hypocycloid input shaft.

Specifically, in this embodiment, the distal part of the shaft 265 of the retainer 250 is formed with a spline, and the eccentric member 310 is spline-connected to the distal part of the shaft 265 of the retainer 250.

According to the hydraulic system 1B of this embodiment, the deceleration mechanism 200 includes the microtraction-type deceleration mechanism 210 and the hypocycloid-type deceleration mechanism 300 that are disposed in-line on the reference axis X, thus a larger deceleration ratio can be obtained than the hydraulic system 1A of the first embodiment, and thus the size of the drive motor 110 can be further reduced.

Third Embodiment

Below, yet another embodiment of the hydraulic system of the present invention will now be described with reference to the attached drawings.

Figure 7:
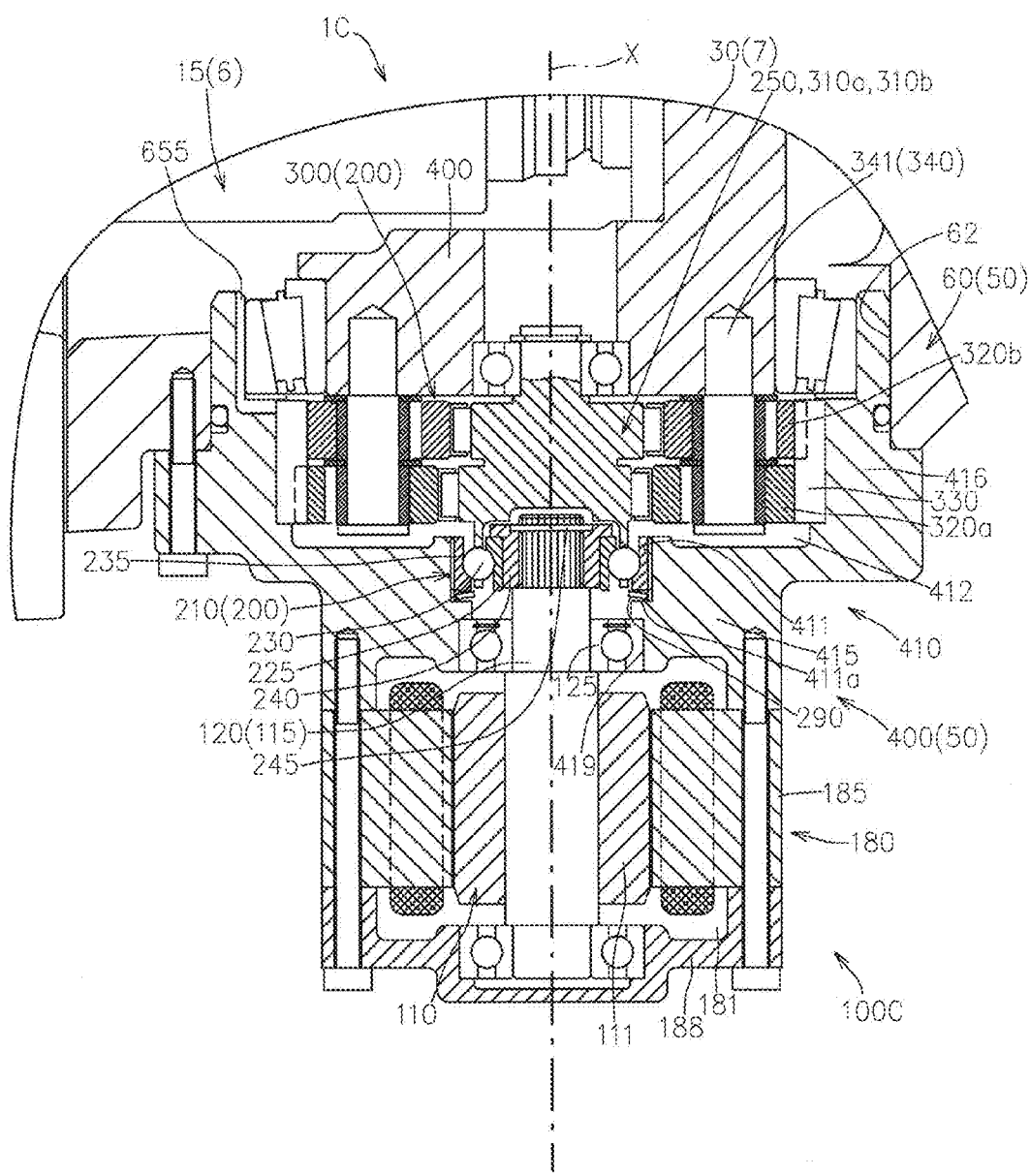
FIG. 7 is a cross-sectional view a hydraulic system according to a third embodiment of the present invention, and corresponds to FIG. 5 of the second embodiment.

FIG. 7 shows a cross-sectional view a hydraulic system 1C according to this embodiment.

In the drawing, substantially the same components as those in the first and second embodiments are given the same reference numbers, and descriptions thereof are omitted as appropriate.

The hydraulic system 1C according to this embodiment is identical to the hydraulic system 1B according to the second embodiment in that the deceleration mechanism 200 has the microtraction-type deceleration mechanism 210 and the hypocycloid-type deceleration mechanism 300, but the accommodating structure for these deceleration mechanisms 210, 300 is different.

Specifically, compared with the hydraulic system 1B according to the second embodiment, the hydraulic system 1C according to this embodiment has a driving unit 100C in place of the driving unit 100B.

As shown in FIG. 7, the driving unit 100C includes the drive motor 110, the drive shaft 120 into which rotary power from the drive motor 110 is directly or indirectly input, the microtraction-type deceleration mechanism 210 that primarily decelerates the rotary power of the drive shaft 120, the hypocycloid-type deceleration mechanism 300 that secondarily decelerates the rotary power that has been decelerated by the microtraction-type deceleration mechanism 210 and transmits the resulting rotary power to the control shaft 40, and a unit case 400 that accommodates the drive motor 110, the hypocycloid-type deceleration mechanism 300, and the microtraction-type deceleration mechanism 210.

As shown in FIG. 7, the unit case 400 has a deceleration case 410 that accommodates the deceleration mechanism 200 and the motor case 180 that accommodates the drive motor 110, and the motor case 180 is removably connected to the first side in the reference axis direction of the deceleration case 410.

The deceleration case 410 has a first accommodating space 411 that is open toward the first side in the reference axis direction via a bearing hole 419 into which the drive shaft 120 is inserted, and a second accommodating space 412 that is in communication with the first accommodating space 411 and is open toward the second side in the reference axis direction.

Specifically, the deceleration case 410 has an end wall 415 that has the bearing hole 419, and a peripheral wall 416 that extends from the circumference of the end wall 415 toward the second side in the reference axis direction, and the second side in the reference axis direction of the peripheral wall 416 is an opening for the second accommodating space 412.

The first accommodating space 411 serves as an accommodating space for the microtraction-type deceleration mechanism 210, and the second accommodating space 412 serves as an accommodating space for the hypocycloid-type deceleration mechanism 300.

In this embodiment as well, the outer ring 235 is an axial direction movable body, and the inner ring 225 is an axial direction fixed body.

Specifically, as shown in FIG. 7, the first accommodating space 411 increases in diameter from the end on the second side in the reference axis direction of the bearing hole 419 via a step 411a.

The outer ring 235 is spline-connected to the inner circumferential surface of the unit case 400 (the deceleration case 410) that defines the first accommodating space 411 so that the outer ring 235 is incapable of rotation around the axis and movable in the axial direction.

A spring that forms the preloading mechanism 290 is interposed between the step 411a and the end face on the first side in the reference axis direction of the outer ring 235, and presses the outer ring 235 toward the second side in the reference axis direction.

That is, in this embodiment, the second side in the reference axis direction is the normal force generated side in the axial direction.

Accordingly, the movement of the inner ring 225, which is an axial direction fixed body, toward the second side in the reference axis direction is prevented.

In this embodiment, as shown in FIG. 7, the drive shaft 120 is provided with a stopper 245 such as a C-ring that is engaged with the end face on the second side in the reference axis direction of the cylindrical member 240 to prevent the movement of the cylindrical member 240 and the inner ring 225 toward the second side in the reference axis direction.

The hypocycloid-type deceleration mechanism 300 is accommodated in the second accommodating space 412 such that the eccentric member 310 rotates around the reference axis X together with the retainer 250, and the internal tooth member 330 is incapable of rotation around the reference axis X.

In this embodiment, as shown in FIG. 7, the retainer 250 and the eccentric member 310 (the first and second eccentric members 310a, 310b) are integrated into a single body.

The effects as obtained in the second embodiment can be obtained with the hydraulic system of this embodiment as well.

Although a spring forms the preloading mechanism 290 in this embodiment and the second embodiment, the preloading mechanism 290 can take a variety of forms as long as it presses the axial direction movable body toward the normal force generated side in the axial direction.

Figure 8:
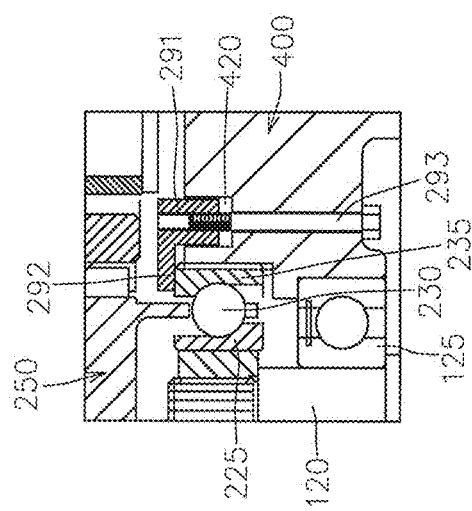
FIG. 8 is a partial cross-sectional view of a modified example of a preloading mechanism in a microtraction-type deceleration mechanism that forms a part of a deceleration mechanism in the hydraulic system according to the third embodiment.

For example, as shown in FIG. 8, the preloading mechanism 290 can be modified to have a movable body 291 that is accommodated so as to be incapable of rotation around the axis and movable in the axial direction in a support hole 420 formed in the unit case 400 so as to extend in parallel to the reference axis X, a pressing piece 292 supported by the movable body 291 so as to be engaged with the corresponding axial direction end face of the axial direction movable body (the outer ring 235 in FIG. 8), and a bolt 293 that is screwed into the movable body 291.

In the modification shown in FIG. 8, rotating the bolt 293 around the axis changes the axial direction position of the movable body 291 within the support hole 420 and thus enables the pressing piece 292 to press the axial direction movable body (the outer ring 235) in the axial direction.

Fourth Embodiment

Below, yet another embodiment of the hydraulic system of the present invention will now be described with reference to the attached drawings.

Figure 9:
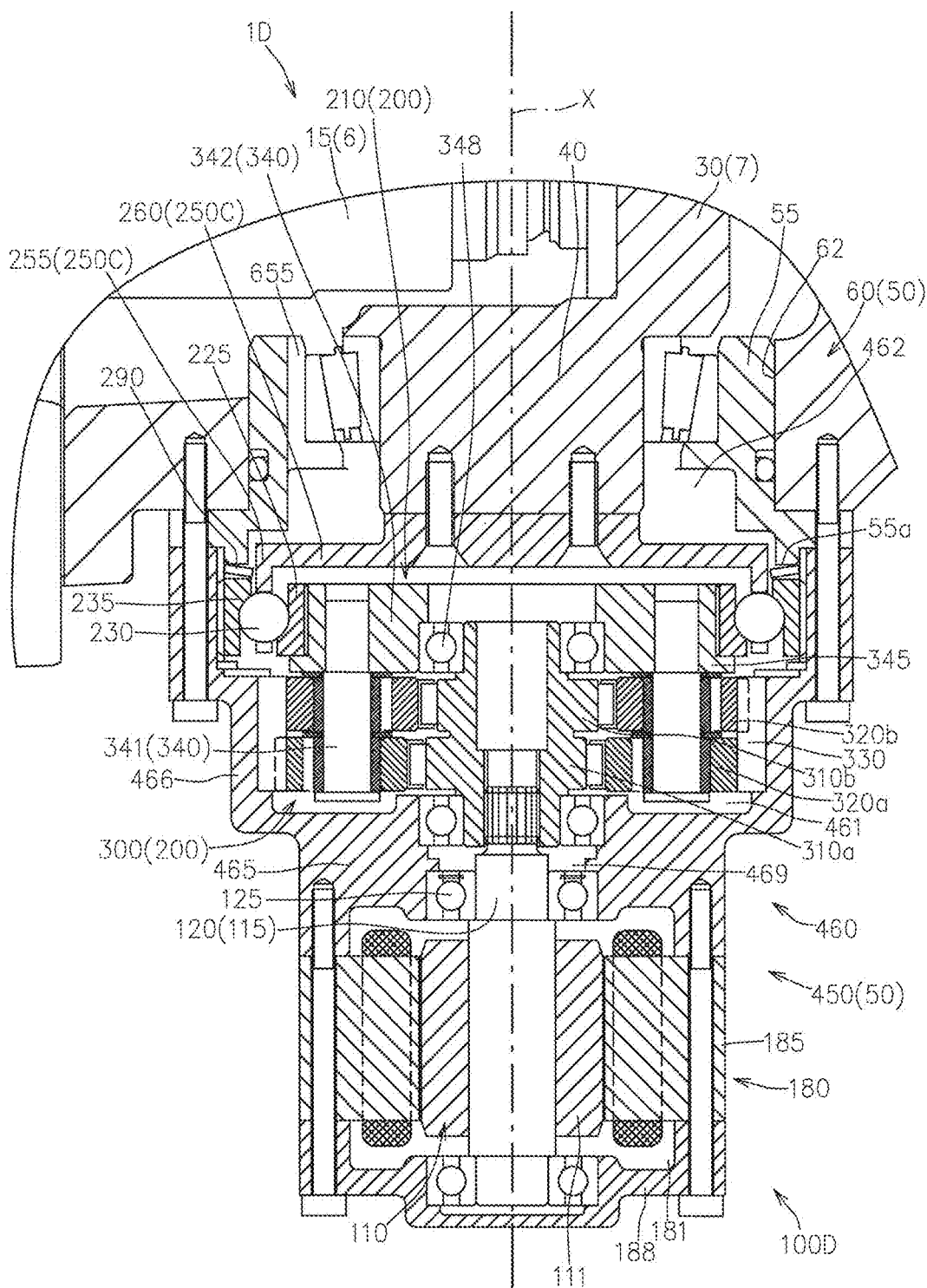
FIG. 9 is a cross-sectional view of a hydraulic system according to a fourth embodiment of the present invention, and corresponds to FIG. 5 of the second embodiment and FIG. 7 of the third embodiment.

FIG. 9 shows a cross-sectional view of a hydraulic system 1D according to this embodiment.

In the drawings, substantially the same components as those in the first to third embodiments are given the same reference numbers, and descriptions thereof are omitted as appropriate.

The hydraulic system 1D according to this embodiment is identical to the hydraulic systems 1B and 1C according to the second and third embodiments in that the deceleration mechanism 200 has the microtraction-type deceleration mechanism 210 and the hypocycloid-type deceleration mechanism 300, but the arrangement of the deceleration mechanisms 210, 300 is different.

That is, in the hydraulic systems 1B, 1C according to the second and third embodiments, the microtraction-type deceleration mechanism 210 is disposed on the upstream side of the hypocycloid-type deceleration mechanism 300 in the power transmission direction (the side close to the drive motor 110 in the power transmission direction).

On the other hand, in the hydraulic system 1D according to this embodiment, the hypocycloid-type deceleration mechanism 300 is disposed on the upstream of the microtraction-type deceleration mechanism 210 in the power transmission direction.

Specifically, compared with the hydraulic systems 1A to 1C according to the first to third embodiments, the hydraulic system 1D has a driving unit 100D in place of the driving units 100A to 100C.

As shown in FIG. 9, the driving unit 100D includes the drive motor 110, the drive shaft 120 into which rotary power from the drive motor 110 is directly or indirectly input, the hypocycloid-type deceleration mechanism 300 that primarily decelerates the rotary power of the drive shaft 120, the microtraction-type deceleration mechanism 210 that secondarily decelerates the rotary power that has been decelerated by the hypocycloid-type deceleration mechanism 300 and transmits the resulting rotary power to the control shaft 40, and a unit case 450 that accommodates the drive motor 110, the hypocycloid-type deceleration mechanism 300, and the microtraction-type deceleration mechanism 210.

As shown in FIG. 9, the unit case 450 has a deceleration case 460 that accommodates the deceleration mechanism 200 and the motor case 180 that accommodates the drive motor 110, and the motor case 180 is removably connected to the first side in the reference axis direction of the deceleration case 460.

The deceleration case 460 has a deceleration mechanism accommodating space that is open toward the first side in the reference axis direction via a bearing hole 469 into which the drive shaft 120 is inserted and that is open toward the second side in the reference axis direction.

The deceleration mechanism accommodating space has a first accommodating space 461 that is open toward the first side in the reference axis direction via the bearing hole 469, and a second accommodating space 462 that is in communication with the second side in the reference axis direction of the first accommodating space 461 and is open toward the second side in the reference axis direction.

Specifically, the deceleration case 460 has an end wall 465 that has the bearing hole 469 and a peripheral wall 466 that extends from the circumference of the end wall 465 toward the second side in the reference axis direction, and the second side in the reference axis direction of the peripheral wall 466 is an opening of the second accommodating space 462.

The first accommodating space 461 serves as an accommodating space for the hypocycloid-type deceleration mechanism 300, and the second accommodating space 462 serves as an accommodating space for the microtraction-type deceleration mechanism 210.

The hypocycloid-type deceleration mechanism 300 is accommodated in the first accommodating space 461, with the eccentric members 310a, 310b being connected to the drive shaft 120 so as to be incapable of relative rotation around the reference axis X, and the internal tooth member 330 being incapable of rotation around the reference axis X.

The microtraction-type deceleration mechanism 210 is accommodated in the second accommodating space 462, with the inner ring 225 being connected to the rotational component extracting member 340 of the hypocycloid-type deceleration mechanism 300 so as to be incapable of relative rotation around the reference axis X, and the outer ring 235 being incapable of rotation around the reference axis X.

In this embodiment, as shown in FIG. 9, the rotational component extracting member 340 has the carrier pins 341 and a disk member 342 that supports the carrier pins 341 so as to rotate around the reference axis X in accordance with the orbital rotation of the carrier pins 341 around the reference axis X.

The disk member 342 is disposed in the inner ring 225 so as to be incapable of relative rotation via spline connection or the like, and, accordingly, rotary power that has been decelerated by the hypocycloid-type deceleration mechanism 300 is input into the inner ring 225.

In this embodiment, the disk member 342 is a ring having a central hole, and is supported by the eccentric members 310a, 310b via a bearing member 348 so as to be relatively rotatable.

In this embodiment as well, the outer ring 235 is an axial direction movable body.

The outer ring 235 is spline-connected to the inner circumferential surface of the unit case 450 (the deceleration case 460) that defines the second accommodating space 462, and, accordingly, is incapable of rotation around the reference axis X and movable in the reference axis direction.

In this embodiment, as shown in FIG. 9, a collar member 55 is attached into the control shaft bearing hole 62 in the hydraulic case 60, and the hydraulic case 60 is attached to the unit case 450 (the deceleration case 460) via the collar member 55.

In this configuration, a spring that forms the preloading mechanism 290 is interposed between a seat 55a formed in the collar member 55 and the end face of the outer ring 235 on the second side in the reference axis direction, and presses the outer ring 235 toward the first side in the reference axis direction.

The movement of the inner ring 225, which is the axial direction fixed body, toward the first side in the reference axis direction is prevented by a flange part 345 provided on the disk member 342.

In this embodiment, although a retainer 250C has the partition 255 and the connector 260, there is no shaft 265.

The connector 260 is connected to the control shaft 40 so as to be incapable of relative rotation around the reference axis X, and, accordingly, rotary power that has been decelerated by the microtraction-type deceleration mechanism 210 is transmitted to the control shaft 40.

In this embodiment, the oil groove 655 that causes the accommodating space of the hydraulic case 60 and the deceleration mechanism accommodating space (the first and second accommodating spaces 461, 462) to be in communication with each other is formed in the collar member 55.

With the hydraulic system 1D according to this embodiment, the microtraction-type deceleration mechanism 210 has a larger size in the radial direction than the hydraulic systems 1B and 1C according to the second and third embodiments, but a larger deceleration ratio can be obtained while the size in the radial direction with reference to the axis of the control shaft 40 is reduced than conventional configurations.

Moreover, as in the first to third embodiments, the self-locking characteristics of the hypocycloid-type deceleration mechanism 300 makes it possible to lessen the driving force of the drive motor 110 required when retaining the movable swash plate 30 at a desire tilt position.

Fifth Embodiment

Below, yet another embodiment of the hydraulic system of the present invention will now be described with reference to the attached drawings.

Figure 10:
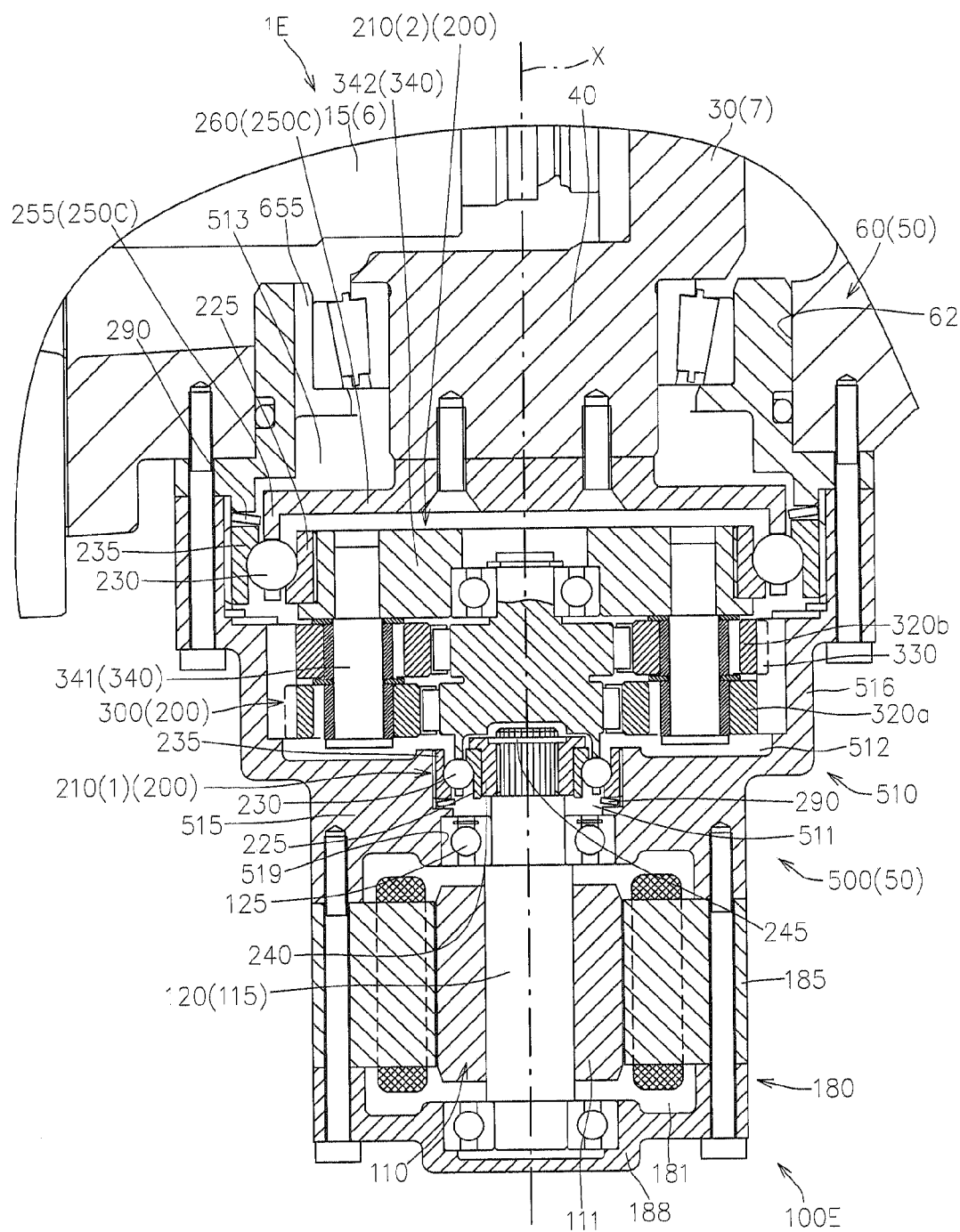
FIG. 10 is a cross-sectional view of a hydraulic system according to a fifth embodiment of the present invention, and corresponds to FIG. 5 of the second embodiment, FIG. 7 of the third embodiment and FIG. 9 of the fourth embodiment.

FIG. 10 shows a cross-sectional view of a hydraulic system 1E according to this embodiment.

In the drawings, substantially the same components as those in the first to fourth embodiments are given the same reference numbers, and descriptions thereof are omitted as appropriate.

The hydraulic system 1E according to this embodiment is different from the hydraulic systems 1A to 1D according to the first to fourth embodiments in that the microtraction-type deceleration mechanism 210 is provided on both the upstream side and the downstream side of the hypocycloid-type deceleration mechanism 300 in the power transmission direction.

Specifically, compared with the hydraulic systems 1A to 1D according to the first to fourth embodiments, the hydraulic system 1E has a driving unit 100E in place of the driving units 100A to 100D.

The driving unit 100E includes the drive motor 110, the drive shaft 120 into which rotary power from the drive motor 110 is directly or indirectly input, a microtraction-type deceleration mechanism 210 that decelerates the rotary power of the drive shaft 120 (hereinafter referred to as a first microtraction-type deceleration mechanism 210(1)), the hypocycloid-type deceleration mechanism 300 that decelerates the rotary power that has been decelerated by the first microtraction-type deceleration mechanism 210(1), a microtraction-type deceleration mechanism 210 that further decelerates the rotary power that has been decelerated by the hypocycloid-type deceleration mechanism 300 (hereinafter referred to as a second microtraction-type deceleration mechanism 210(2)), and a unit case 500 that accommodates the drive motor 110, the first microtraction-type deceleration mechanism 210(1), the hypocycloid-type deceleration mechanism 300, and the second microtraction-type deceleration mechanism 210(2).

The first microtraction-type deceleration mechanism 210(1) has substantially the same configuration as the microtraction-type deceleration mechanism 210 in the third embodiment.

The hypocycloid-type deceleration mechanism 300 and the second microtraction-type deceleration mechanism 210(2) have substantially the same configurations as the hypocycloid-type deceleration mechanism 300 and the microtraction-type deceleration mechanism 210 in the fourth embodiment, respectively.

That is, compared with the driving unit 100D of the hydraulic system 1D according to the fourth embodiment, the driving unit 100E has a configuration in which the microtraction-type deceleration mechanism 210 of the third embodiment is interposed between the drive shaft 120 and the hypocycloid-type deceleration mechanism 300.

The unit case 500 has a deceleration case 510 that accommodates the first microtraction-type deceleration mechanism 210(1), the hypocycloid-type deceleration mechanism 300, and the second microtraction-type deceleration mechanism 210(2), and the motor case 180 that accommodates the drive motor 110. The motor case 180 is removably connected to the first side in the reference axis direction of the deceleration case 510.

The deceleration case 510 has a deceleration mechanism accommodating space that is open toward the first side in the reference axis direction via a bearing hole 519 into which the drive shaft 120 is inserted, and that is open toward the second side in the reference axis direction.

The deceleration mechanism accommodating space has a first accommodating space 511 that is open toward the first side in the reference axis direction via the bearing hole 519, a second accommodating space 512 that is in communication with the second side in the reference axis direction of the first accommodating space 511, and a third accommodating space 513 that is in communication with the second side in the reference axis direction of the second accommodating space 512 and is open toward the second side in the reference axis direction.

Specifically, the deceleration case 510 has an end wall 515 that has the bearing hole 519 and a peripheral wall 516 that extends from the circumference of the end wall 515 toward the second side in the reference axis direction, and the second side in the reference axis direction of the peripheral wall 516 is an opening of the third accommodating space 513.

The first accommodating space 511 serves as an accommodating space for the first microtraction-type deceleration mechanism 210(1), the second accommodating space 512 serves as an accommodating space for the hypocycloid-type deceleration mechanism 300, and the third accommodating space 513 serves as an accommodating space for the second microtraction-type deceleration mechanism 210(2).

With the hydraulic system 1E according to this embodiment, power can be transmitted from the drive shaft 120 to the control shaft 40 at a larger deceleration ratio, and the size of the drive motor 110 can be further reduced, than with the hydraulic systems 1A to 1D according to the first to fourth embodiments.

The hydraulic systems 1A to 1E according to the respective embodiments can include a brake unit 600 capable of directly or indirectly applying braking force to the drive shaft 120.

Figure 11:
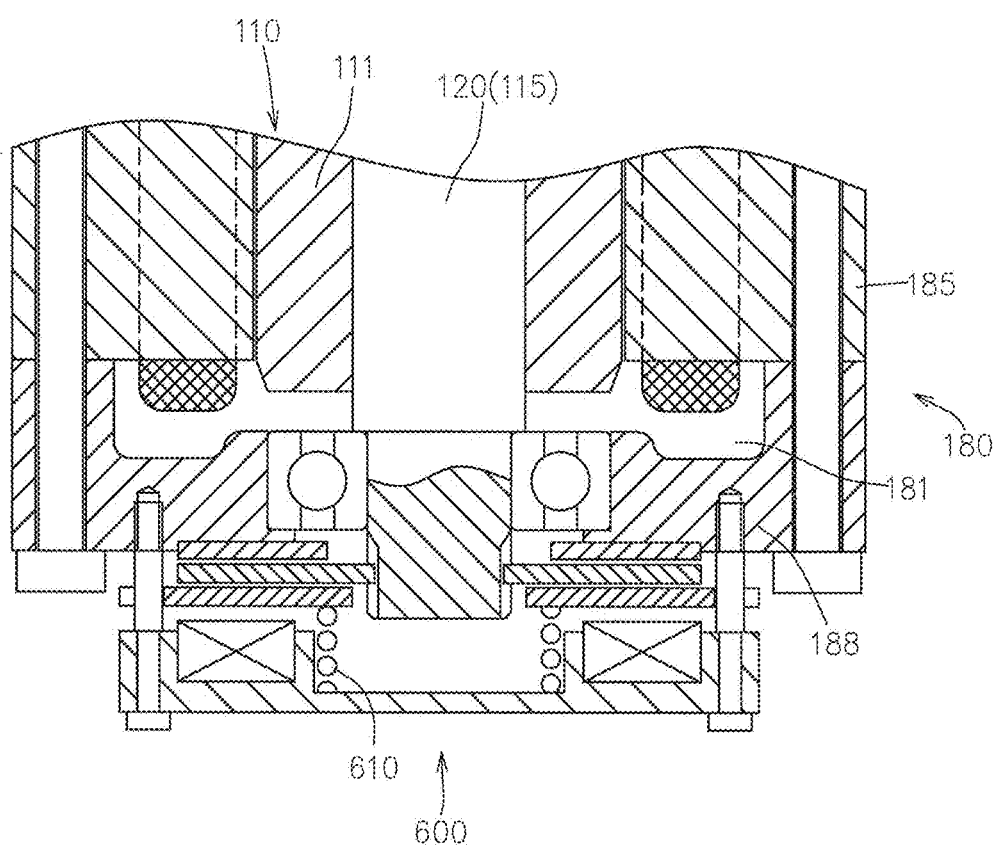
FIG. 11 is a partial cross-sectional view of a modified example of the hydraulic system according to the present invention, the modified example including a brake unit.

FIG. 11 shows a partial cross-sectional view of one example of a hydraulic system that includes the brake unit 600.

In the example shown in FIG. 11, the brake unit 600 is configured to be capable of applying braking force to the drive motor output shaft 115.

The brake unit 600 is configured to directly or indirectly apply braking force to the drive shaft 120 when the drive motor 110 is not driven, and cancel the breaking force when the drive motor 110 is driven.

With the brake unit 600, the movable swash plate 30 can be securely retained at a desired tilt position.

Preferably, as shown in FIG. 11, in a case where the motor body 111 is an electric motor, the brake unit 600 may be an electric negative brake that directly or indirectly applies braking force to the drive shaft 120 by taking advantage of the biasing force of a brake spring 610 when electricity is not supplied to the motor body 111, and exerts force against the biasing force of the brake spring 610 to cancel the breaking force when electricity is supplied to the motor body 111.

In a case where the motor body is a hydraulic motor (not shown), the brake unit may be a hydraulic negative brake that directly or indirectly applies braking force to the drive shaft by taking advantage of the biasing force of a brake spring when the motor body is stopped by suspending a supply of a hydraulic oil pressure to the motor body, and exerts a hydraulic pressure against the biasing force of the brake spring to cancel the breaking force when a hydraulic oil pressure is supplied to the motor body to spin the motor body.

In the example shown in FIG. 11, the end on the first side in the reference axis direction (the side far from the deceleration mechanism) of the drive motor output shaft extends outward from the motor case, and the brake unit is attached to the motor case so as to be capable of applying braking force to the extending end of the drive motor output shaft.

Instead, the brake unit can be modified to apply braking force between the drive motor output shaft that acts as the drive shaft and the deceleration mechanism.

In the above embodiments, the hydraulic pump 15 is a variable volume type, and the driving units 100A to 100E are included in the hydraulic systems 1A to 1E to vary the volume of the hydraulic pump 15. Naturally, the present invention is not limited to such a form.

For example, in a configuration in which the hydraulic motor 25, instead of or in addition to the hydraulic pump 15, is a variable volume type, the driving units 100A to 100E are included in the hydraulic systems 1A to 1E to vary the volume of the hydraulic motor 25.

Furthermore, the present invention, naturally, is also applicable to a hydraulic system that has only a variable-volume hydraulic pump, and a hydraulic system that has only a variable-volume hydraulic motor.

The invention claimed is:

1. A hydraulic system, comprising:
    a rotational shaft;
    a hydraulic rotor supported by the rotational shaft so as to be incapable of relative rotation;
    an output adjuster that varies a volume of the hydraulic rotor;
    a control shaft that tilts the output adjuster in accordance with rotation around an axis;
    a drive motor that produces rotational power for operating the control shaft around the axis;
    a drive shaft disposed on a reference axis that is the same axis as the axis of the control shaft and operably driven around the axis by the drive motor;
    a deceleration mechanism that decelerates rotary power operably input from the drive shaft and outputs the decelerated rotary power toward the control shaft; and
    a housing that accommodates the hydraulic rotor, the output adjuster, and the deceleration mechanism,
    wherein the deceleration mechanism comprises a hypocycloid-type deceleration mechanism disposed on the reference axis, and a microtraction-type deceleration mechanism on at least one of an upstream side and a downstream side of the hypocycloid-type deceleration mechanism in a power transmission direction from the drive shaft to the control shaft.

2. The hydraulic system according to claim 1, wherein the drive motor is disposed on the reference axis.

3. The hydraulic system according to claim 1, wherein
    the housing includes a hydraulic case that accommodates the hydraulic rotor and the output adjuster, and a unit case that accommodates the deceleration mechanism and the drive motor and is removably connected to the hydraulic case;
    the hydraulic case has a control shaft bearing hole that opens an end face of the control shaft outward; and
    the unit case is connected to the hydraulic case to cover the control shaft bearing hole, with an output member of the hypocycloid-type deceleration mechanism being connected to the control shaft so as to be incapable of relative rotation around the reference axis.

4. The hydraulic system according to claim 3, wherein the hydraulic case and the unit case, in a state in which the unit case is connected to the hydraulic case, are configured such that oil is flowable between an accommodating space of the hydraulic case and a deceleration mechanism accommodating space of the unit case.

5. The hydraulic system according to claim 1, wherein the hypocycloid-type deceleration mechanism includes:
    an eccentric member that has a center of rotation eccentric to the reference axis and eccentrically rotates relative to the reference axis in accordance with rotation of the drive shaft around the reference axis;
    an external tooth member that is supported by the eccentric member so as to be relatively rotatable and is provided with external teeth on an outer circumferential surface;
    an internal tooth member that has an inner diameter larger than an outer diameter of the external tooth member and is provided with internal teeth that mesh with the external teeth and the number of which is different from the number of the external teeth; and
    a rotational component extracting member that extracts a rotational component around the reference axis from the external tooth member and outputs the rotational component toward the control shaft.

6. The hydraulic system according to claim 5, wherein
    the external tooth member has a cam hole that penetrates the external tooth member in a direction parallel to the reference axis; and
    the rotational component extracting member has a carrier pin having an outer diameter smaller than an inner diameter of the cam hole and inserted into the cam hole, the carrier pin being connected to the control shaft.

7. The hydraulic system according to claim 5, wherein the eccentric member is supported by the drive shaft so as to be incapable of relative rotation.

8. The hydraulic system according to claim 7, wherein
    the housing includes a hydraulic case that accommodates the hydraulic rotor and the output adjuster and a unit case that accommodates the deceleration mechanism and the drive motor;
    the hydraulic case has a control shaft bearing hole that opens the end face of the control shaft outward; and
    the unit case has a peripheral wall that extends in the reference axis direction, and a partitioning wall that partitions an internal space of the peripheral wall into a drive motor accommodating space on a first side in the reference axis direction and a deceleration mechanism accommodating space on a second side in the reference axis direction, which is opposite to the first side, and is provided with a drive shaft bearing hole through which the drive shaft is inserted, and the unit case is removably connected to the hydraulic case so as to cover the control shaft bearing hole, with the deceleration mechanism accommodating space facing the end face of the control shaft.

9. The hydraulic system according to claim 8, wherein the unit case includes a deceleration case that forms the deceleration mechanism accommodating space and a motor case that forms the drive motor accommodating space;
    the deceleration case has a deceleration-case-side peripheral wall that forms a part of the peripheral wall, and an end wall that blocks the first side in the reference axis direction of the deceleration-case-side peripheral wall and forms the partitioning wall; and
    the motor case is removably connected to the first side in the reference axis direction of the deceleration case.

10. The hydraulic system according to claim 1, further comprising a brake that directly or indirectly applies braking force to the drive shaft, wherein
    the brake applies braking force to the drive shaft when the drive motor is not driven, and cancels the braking force to the drive shaft when the drive motor is driven.

11. The hydraulic system according to claim 1, wherein the microtraction-type deceleration mechanism includes:

a bearing member that has an inner ring directly or indirectly connected to the drive shaft so as to be incapable of relative rotation, a plurality of rolling elements, and an outer ring, and is capable of bearing a radial load and a unidirectional axial load;

a retainer that retains the plurality of rolling elements around the inner ring at predetermined intervals while allowing the rolling elements to rotate around respective centers of rotation, and rotates around an axis of the inner ring in accordance with an orbital rotation of the plurality of rolling elements around the inner ring; and a preloading mechanism that presses at least one of the inner ring and the outer ring in the axial direction to exert a radial load on the rolling elements.

12. The hydraulic system according to claim 11, wherein the housing includes a hydraulic case that accommodates the hydraulic rotor and the output adjuster and a unit case that accommodates the deceleration mechanism and the drive motor;

the hydraulic case has a control shaft bearing hole that opens the end face of the control shaft outward;

the unit case has a peripheral wall that extends in the reference axis direction, and a partitioning wall that partitions an internal space of the peripheral wall into a drive motor accommodating space on a first side in the reference axis direction and a deceleration mechanism accommodating space on a second side in the reference axis direction, which is opposite to the first side, and is provided with a drive shaft bearing hole through which the drive shaft penetrates the partitioning wall, and the unit case is removably connected to the hydraulic case so as to cover the control shaft bearing hole, with the deceleration mechanism accommodating space facing the end face of the control shaft;

the deceleration mechanism accommodating space has a first accommodating space that is in communication with the drive motor accommodating space via the drive shaft bearing hole, and a second accommodating space that is in communication with the first accommodating space and opens to the second side in the reference axis direction so as to face the end face of the control shaft;

the outer ring is engaged with an inner circumferential surface of the unit case that defines the first accommodating space so as to be incapable of rotation around the axis and movable in the axial direction; and the internal tooth member is engaged with the inner circumferential surface of the unit case that defines the second accommodating space so as to be incapable of rotation around the axis.

13. The hydraulic system according to claim 12, wherein the first accommodating space increases in diameter via a step from an end on the second side in the reference axis direction of the drive shaft bearing hole;

a spring that acts as the preloading mechanism is interposed between the step and the end face on the first side in the reference axis direction of the outer ring;

a cylindrical member is disposed in the inner ring so as to be incapable of relative rotation around the axis and incapable of relative movement in the axial direction;

an inner circumferential surface of the cylindrical member has a spline that is engaged with a spline provided in the drive shaft; and the drive shaft has a stopper that is engaged with an end face on the second side in the reference axis direction of the cylindrical member to prevent movement of the cylindrical member and the inner ring toward the second side in the reference axis direction.

14. The hydraulic system according to claim 11, wherein the housing comprises a hydraulic case that accommodates the hydraulic rotor and the output adjuster and a unit case that accommodates the deceleration mechanism and the drive motor;

the hydraulic case has a control shaft bearing hole that opens the end face of the control shaft outward;

the unit case has:
 a deceleration case that has a peripheral wall extending in the reference axis direction and a partitioning wall partitioning an internal space of the peripheral wall into a first accommodating space that opens toward a first side in the reference axis direction and a second accommodating space that opens toward a second side in the reference axis direction, which is opposite to the first side, and
 a motor case that has a drive motor accommodating space and is removably connected to the deceleration case;

the outer ring is engaged with an inner circumferential surface of the deceleration case that defines the first accommodating space so as to be incapable of rotation around the axis and movable in the axial direction;

the internal tooth member is engaged with the inner circumferential surface of the deceleration case that defines the second accommodating space so as to be incapable of rotation around the axis;

the deceleration case is removably connected to the hydraulic case to cover the control shaft bearing hole, with the end face of the control shaft facing the second accommodating space; and the motor case has an end wall provided with a drive shaft bearing hole through which the drive shaft penetrates the end wall, and is removably connected to the deceleration case to cover the opening of the first accommodating space with the end wall.

15. The hydraulic system according to claim 14, wherein the first accommodating space has a large diameter part opening toward the first side in the reference axis direction and a step extending radially inward from the second side in the reference axis direction of the large diameter part;

a spring that acts as the preloading mechanism is interposed between the step and an end face on the second side in the reference axis direction of the outer ring;

a cylindrical member is disposed in the inner ring so as to be incapable of relative rotation around the axis and incapable of relative movement in the axial direction;

an inner circumferential surface of the cylindrical member has a spline that is engaged with a spline provided on the drive shaft; and movement of the cylindrical member toward the first side in the reference axis direction is prevented by a bearing member provided in the drive shaft bearing hole to support the drive shaft so as to be rotatable around the axis.

16. A driving unit with deceleration mechanism, comprising:
 a drive motor that serves as a power source for driving a drive-target output shaft disposed on a reference axis;
 a drive shaft that is disposed on the reference axis on a first side in a reference axis direction and rotated around the axis by rotary power from the drive motor;

a deceleration mechanism that decelerates rotary power of the drive shaft and outputs the decelerated rotary power toward the output shaft disposed on a second side in the reference axis direction, which is opposite to the first side; and a unit case that accommodates the drive motor and the deceleration mechanism, wherein the deceleration mechanism has a hypocycloid-type deceleration mechanism, and a microtraction-type deceleration mechanism disposed on at least one of an upstream side and a downstream side of the hypocycloid-based deceleration mechanism in a power transmission direction.

17. The driving unit with deceleration mechanism according to claim 16, further comprising a brake that directly or indirectly applies braking force to the drive shaft, wherein the brake applies braking force to the drive shaft when the drive motor is not driven, and cancels the braking force to the drive shaft when the drive motor is driven.

18. The driving unit with deceleration mechanism according to claim 16, wherein the drive shaft is primarily decelerated by the microtraction-type deceleration mechanism and secondarily decelerated by the hypocycloid-type deceleration mechanism.

19. A hydraulic system, comprising:
a rotational shaft;
a hydraulic rotor supported by the rotational shaft so as to be incapable of relative rotation;
an output adjuster that varies a volume of the hydraulic rotor;
a control shaft that tilts the output adjuster in accordance with rotation around an axis;
a drive motor that produces rotational power for operating the control shaft around the axis;
a drive shaft disposed on a reference axis that is the same axis as the axis of the control shaft and operably driven around the axis by the drive motor;
a deceleration mechanism that decelerates rotary power operably input from the drive shaft and outputs the decelerated rotary power toward the control shaft; and
a housing that accommodates the hydraulic rotor, the output adjuster, and the deceleration mechanism,
wherein the deceleration mechanism has a hypocycloid-type deceleration mechanism disposed on the reference axis,
wherein the housing includes a hydraulic case that accommodates the hydraulic rotor and the output adjuster, and a unit case that accommodates the deceleration mechanism and the drive motor and is removably connected to the hydraulic case,
wherein the hydraulic case has a control shaft bearing hole that opens an end face of the control shaft outward, and
wherein the unit case is connected to the hydraulic case to cover the control shaft bearing hole, with an output member of the hypocycloid-type deceleration mechanism being connected to the control shaft so as to be incapable of relative rotation around the reference axis.

20. The hydraulic system according to claim 19, wherein the hydraulic case and the unit case, in a state in which the unit case is connected to the hydraulic case, are configured such that oil is flowable between an accommodating space of the hydraulic case and a deceleration mechanism accommodating space of the unit case.

* * * * *